(12) United States Patent
Soares et al.

(10) Patent No.: US 6,424,519 B2
(45) Date of Patent: Jul. 23, 2002

(54) PLUG-IN DRAW OUT UNIT

(75) Inventors: Gilbert Anthony Soares; Richard Emery Bernier, both of Mebane; Charles Piper, Burlington; Edgar Yee, Chapel Hill; John Joseph Struble, Jr., Mebane; Edward Bruce Bynum, Jr., Chapel Hill, all of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,436

(22) Filed: Apr. 4, 2001

Related U.S. Application Data

(63) Continuation-in-part of application No. 09/539,951, filed on Mar. 31, 2000, which is a continuation of application No. 09/438,108, filed on Nov. 10, 1999, now abandoned, and a continuation-in-part of application No. 09/437,765, filed on Nov. 9, 1999.

(51) Int. Cl.⁷ .......................... H02B 11/12; H01H 25/00
(52) U.S. Cl. ...................... 361/608; 200/331; 200/400; 200/50.21
(58) Field of Search .................. 200/50.03–50.06, 200/50.17, 50.21–50.24, 50.11, 330–332.1; 361/606–609, 614–615

(56) References Cited

U.S. PATENT DOCUMENTS

| | | | | |
|---|---|---|---|---|
| 2,418,006 A | * | 3/1947 | Bangert | 200/331 |
| 3,475,576 A | * | 10/1969 | Bugni et al. | 200/331 |
| 4,154,993 A | | 5/1979 | Kumbera et al. | |
| 4,873,404 A | * | 10/1989 | Fritsch | 200/332 |
| 5,107,396 A | | 4/1992 | Rosen et al. | |
| 5,193,666 A | * | 3/1993 | Markowski et al. | 200/331 |
| 5,973,279 A | * | 10/1999 | Turner et al. | 200/331 |

* cited by examiner

Primary Examiner—Gregory Thompson
(74) Attorney, Agent, or Firm—Cantor Colburn LLP

(57) ABSTRACT

A draw out unit with improved drawout box and handle assembly is disclosed. The drawout box is designed to accommodate an improved terminal assembly of the present invention, which reduces the dimensions of the box, and further provides access to the interior of the box by providing an open side for allowing service of an electrtical device within the bucket thus permitting the motor control center to remain active during service. The drawout box of the present invention further includes an improved handle assembly with operable connection to a circuit breaker handle within the confines of the smaller drawout box.

17 Claims, 22 Drawing Sheets

PRIOR ART    FIG. 14
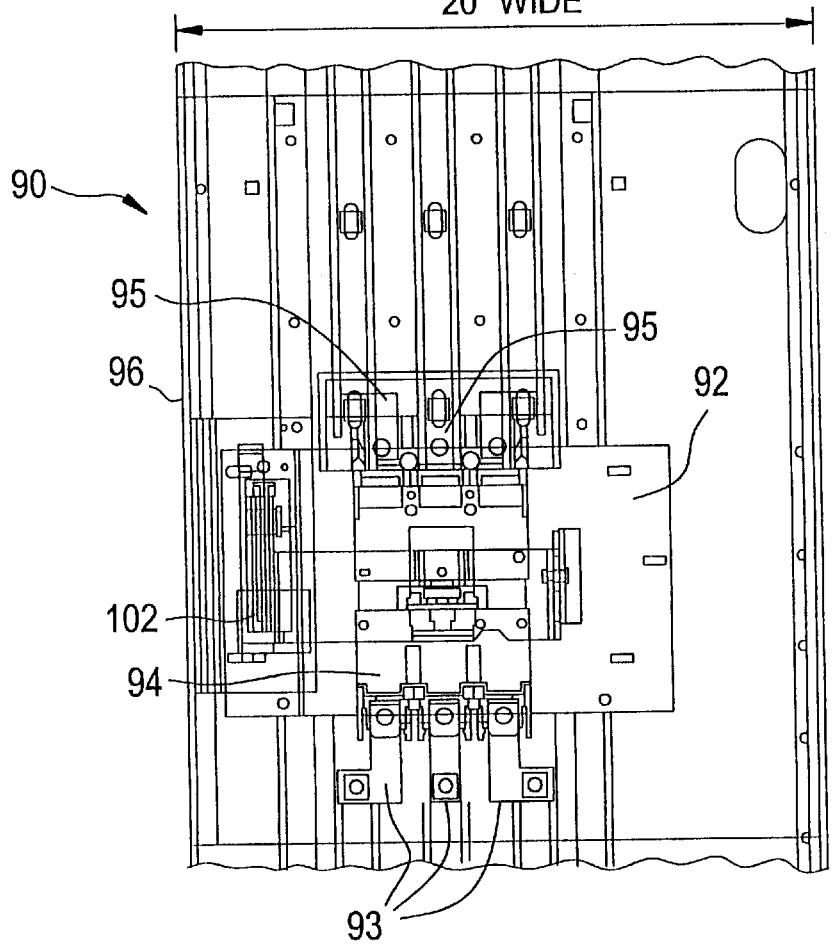
PRIOR ART    FIG. 15
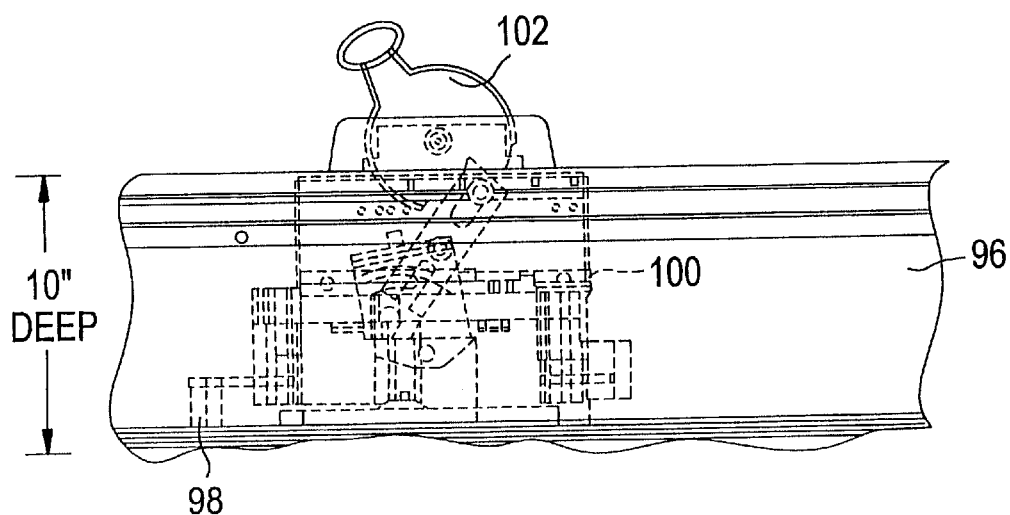

ized in draw out units. Sliding stabs usually plug into a housing with opposing prongs being biased toward each other on the sliding stabs to contact either side of the bus bars, whereby the electrical connection between the motor controller unit and the bus bars is maintained. Lugs on the sliding stabs are connected to bus straps extending from the lugs to the line side of a circuit interrupting device such as a circuit breaker. Bus straps also extend from the load side of the circuit interrupting device to the line side of a distribution power load circuit, such as a starter.

PLUG-IN DRAW OUT UNIT

CROSS REFERENCE TO RELATED APPLICATIONS

This application is a continuation-in-part of U.S. patent application Ser. No. 09/539,951, entitled DRAWOUT UNIT AND LOAD/LINE TERMINAL ASSEMBLY filed Mar. 31, 2000, which is incorporated herein by reference in its entirety, which is a continuation of U.S. patent application 09/438,108 filed Nov. 10, 1999, now abandoned, which is also incorporated herein by reference in its entirety. This application is also a continuation-in-part of U.S. patent application Ser. No. 09/437,765 filed Nov. 9, 1999, entitled LUG-ADAPTER ASSEMBLY HAVING REDUCED FORCE CLIPS, which is incorporated herein by reference in its entirety.

BACKGROUND OF INVENTION

The present invention relates generally to draw out units. More particularly, the present invention relates to a plug-in circuit breaker main or feeder disconnect for a draw-out unit.

The use of switchgears in electrical distribution systems is well known. The switchgear houses a plurality of draw out units, with each draw out unit housing one or more switching devices, such as motor controllers and circuit breakers, which are releasably interconnected to one or more busbars. Periodically, the draw out units are removed from the switchgear to allow for maintenance of the equipment. The switching devices within the draw out units make electrical contact with the busbars through a plurality of clip connectors which extend from the draw out unit. Each clip connector is electrically connected to an electrical conductor for connection to the switching devices of the switchgear.

In a motor control system, vertical bus bars which carry current to motor controller units are arranged vertically in drawout units. Sliding stabs usually plug into a housing with opposing prongs being biased toward each other on the sliding stabs to contact either side of the bus bars, whereby the electrical connection between the motor controller unit and the bus bars is maintained. Lugs on the sliding stabs are connected to bus straps extending from the lugs to the line side of a circuit interrupting device such as a circuit breaker. Bus straps also extend from the load side of the circuit interrupting device to the line side of a distribution power load circuit, such as a starter.

Clip connectors of the prior art are generally mounted within an insulative housing that is affixed to a frame of the draw out unit. Each clip connector is typically constructed of an electrically conductive material formed into a "U" shape. The two free ends of the "U"-shaped clip form contact arms, which extend within the clip housing and are aligned for electrical connection with a specific busbar. As the draw out unit is inserted into the switchgear, the busbar slides between the two contact arms, and the contact arms frictionally engage the busbar. Typically, only one clip connector attaches to each bus bar.

The design of the contact clip requires each contact arm to have a surface area in contact with the bus bar to reduce resistance to current flow and thereby prevent inefficient thermal losses. In the U-shaped contact clips found in the prior art, a contact surface is formed along the entire width of each of the two contact arms. Ideally, these contact surfaces remain parallel to the bus bar when the bus bar is engaged between the two contact arms, thus allowing the full width of the contact arm to be in contact with the bus bar. However, inaccuracies during manufacturing and mishandling during installation can cause deformities the contact arms and their contact surfaces. Such deformities allow only a small portion of the contact arm to actually contact the bus bar, resulting in an increase in resistance to current flow.

The design of the contact clip also requires that the contact arms exert a minimum compressive force (force per unit of area in contact with the bus bar) onto the busbar. This force is required to overcome the electromagnetic force generated by current flow in the contact arms, which tends to part the arms from the bus bar. Problematically, the required minimum compressive force is proportional to the amount of force required to insert the contact clips onto the busbar. In other words, clips having a high compressive force are difficult to slide onto the busbar. As a result, it is necessary to use a racking mechanism in order to develop sufficient insertion force to install the draw out unit into the switchgear. The need for a racking mechanism increases the equipment cost for switchgear installation and maintenance. In addition, the need for a racking mechanism necessitates that clearance space be provided for the racking mechanism within the switchgear. The additional clearance space increases the size and cost of the switchgear itself.

Load terminals are electrically connected to the load side of the distribution power load circuit and are typically positioned to allow an output cable to be connected to them in a vertical configuration. These load terminals are generally bushings positioned on the bottom of the distribution power load circuit and have an axially threaded terminal to which output cable connections are made. Alternately, output cables of a thinner diameter may have attachments on one end that allow them to be secured to load terminals with screws or bolts. One particular method of securing output cable to a load terminal, as described in U.S. Pat. No. 4,154,993 entitled "Cable Connected Drawout Switchgear", involves mounting circuit equipment on a rolling carriage such that the load terminals engage connectors on stationary cables when the carriage is rolled over the cable connectors. Another method described in U.S. Pat. No. 5,107,396 entitled "Circuit Breaker Combined Terminal Lug and Connector" involves sliding a cable connector disposed axially on the end of a cable into a receiving slot on a terminal lug. Both of these methods of attaching output cable are such that the output cable depends vertically, and not horizontally, from the load terminals.

Output cable extending vertically down from the load terminals must be bent at two right angles thus forming an S-shape before passing through an exit port in the bottom of the drawout unit. Depending on the voltage class, output cable may be up to a few inches in diameter and relatively inflexible due to its construction. Consequently, the minimum bending radius of the cable may be large. Because of this large minimum bending radius of the cable, and because the output port through which the output cable passes is usually not directly below the load terminals, the cable must be bent at right angles twice to pass out of the drawout assembly. Bending the cable to form two right angles requires an appreciable amount of space more than a single right angle bend would require. Thus, the drawout assembly must be of a larger size than is really necessary to accommodate both right angle bends. Furthermore, as the number of output cables depending from the load terminals increases, an increasing amount of space is required at the bottom of the drawout to accommodate the cables.

SUMMARY OF INVENTION

The above discussed and other drawbacks and deficiencies of the prior art are overcome or alleviated by a drawout box for a motor control center. In an exemplary embodiment of the invention, the drawout box comprises a drawout base having a first side edge, second side edge, third side edge, and fourth side edge, a first side having a first side periphery, a second side having a second side periphery, a third side having a first side edge and a second side edge, a fourth side having a first side edge and a second side edge, a top bar of the first side connecting the third side to the fourth side, a top bar of the second side connecting the third side to the fourth side, wherein the first side periphery is defined by the top bar of the first side, the first side edge of the third side, the first side edge of the drawout base, and the first side edge of the fourth side, and the second side periphery is defined by the top bar of the second side, the second side edge of the third side, the second side edge of the drawout base, and the second side edge of the fourth side, and further wherein the second side allows free access into the drawout box and the first side includes a connection for a drawout handle.

In another exemplary embodiment of the invention, a drawout assembly comprises the above-described drawout box, plus a terminal assembly mounted upon the drawout base, the terminal assembly including a bus brace, the bus brace having a base plate, an upper surface of said base plate supporting a plurality of lug engaging receptacles, a lower surface of said base plate including sections for receiving bus straps, a corresponding number of lugs for receipt within the plurality of lug engaging receptacles, each lug including at least one port for receiving an output cable, each port having an axis lying parallel to a plane of said base plate and substantially perpendicular to longitudinal axes of the sections in the lower surface of said base plate, and, a plurality of output cables extending from the lugs and through the second side of the drawout box.

The above-discussed and other features and advantages of the present invention will be appreciated and understood by those skilled in the art from the following detailed description and drawings.

BRIEF DESCRIPTION OF DRAWINGS

Referring to the exemplary drawings wherein like elements are numbered alike in the several FIGURES:

FIG. 14 is a top schematic view of a drawout of the prior art;

FIG. 15 is a side cross-sectional view of FIG. 14;

DETAILED DESCRIPTION

Figure 1:
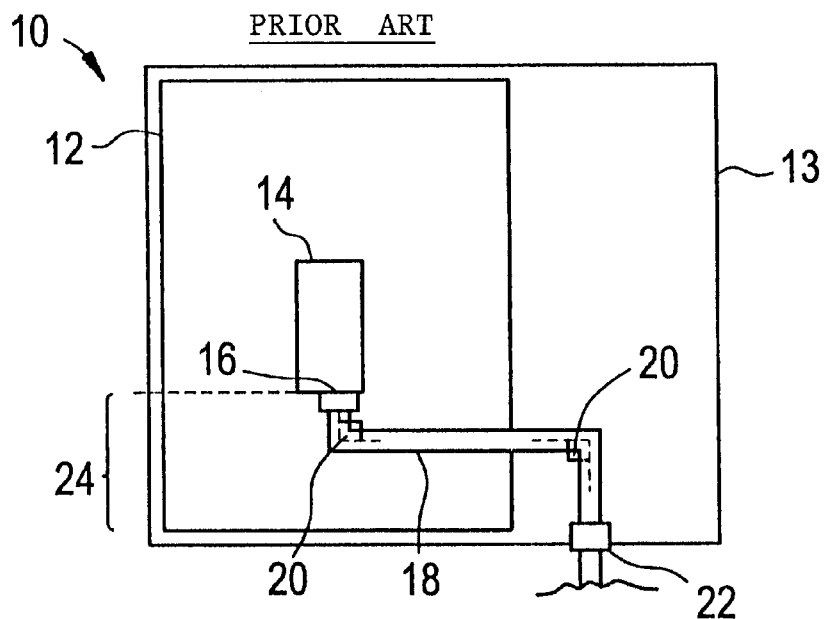
FIG. 1 is a schematic view of a drawout of prior art construction illustrating a distance between the load terminal and the output cable port.

Referring to FIG. 1, a drawout box of the prior art is generally shown at 10. Drawout box 10 is comprised of rigid panels to form a shell 12 that is open on one side. Shell 12 is movably connected to the inside of a second shell or bucket 13. Situated within shell 12 is a distribution power load circuit 14 having a load terminal assembly 16 located generally on the bottom of distribution power load circuit 14. A cable 18 extends vertically down from load terminal assembly 16 and twice is bent at right angles 20 before passing vertically down through an outlet port 22 in the bottom of bucket 13. The radius of cable 18 in combination with right angles 20 defines a distance 24 between load terminal assembly 16 and the bottom wall of shell 12.

Figure 2:
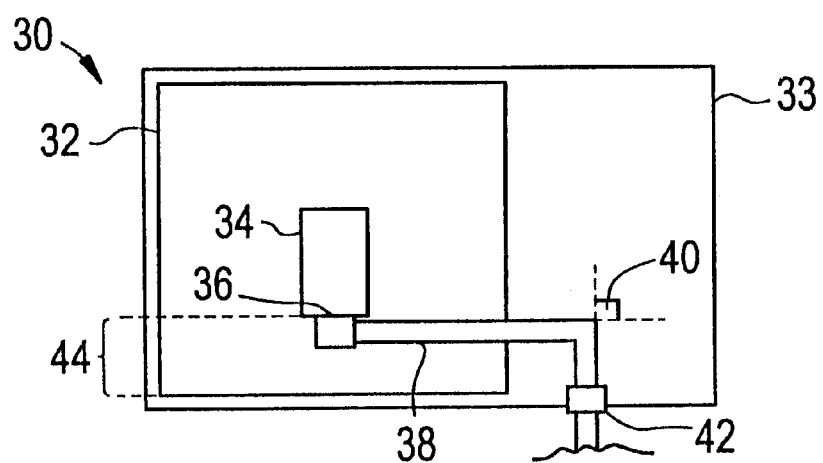
FIG. 2 is a schematic view of a drawout illustrating a decreased distance between the load terminal and the output cable port, of the present invention.

FIG. 2 is a drawout box of an exemplary embodiment of the present invention generally shown at 30. Drawout box 30 is comprised of rigid panels to form a shell 32 that is open on one side. Shell 32 is movably connected to the inside of a second shell or bucket 33. A load terminal assembly 36 is located on the bottom of distribution power load circuit 34. A cable 38 extends horizontally from load terminal assembly 36 and is bent only once at a right angle 40 before passing vertically down through an outlet port 42 in the bottom of bucket 33. The radius of cable 38 in combination with single right angle 40 defines a distance 44 between load terminal assembly 36 and the bottom wall of shell 32. Because of single right angle bend 40 in cable 38, as opposed to double right angle bends 20 in cable 18, distance 44 is less than distance 24. Decreased distance 44 allows drawout box 30 to be made of smaller dimensions thus making a more efficient use of space within drawout box 30 and rendering drawout box 30 more manageable.

Figure 3:
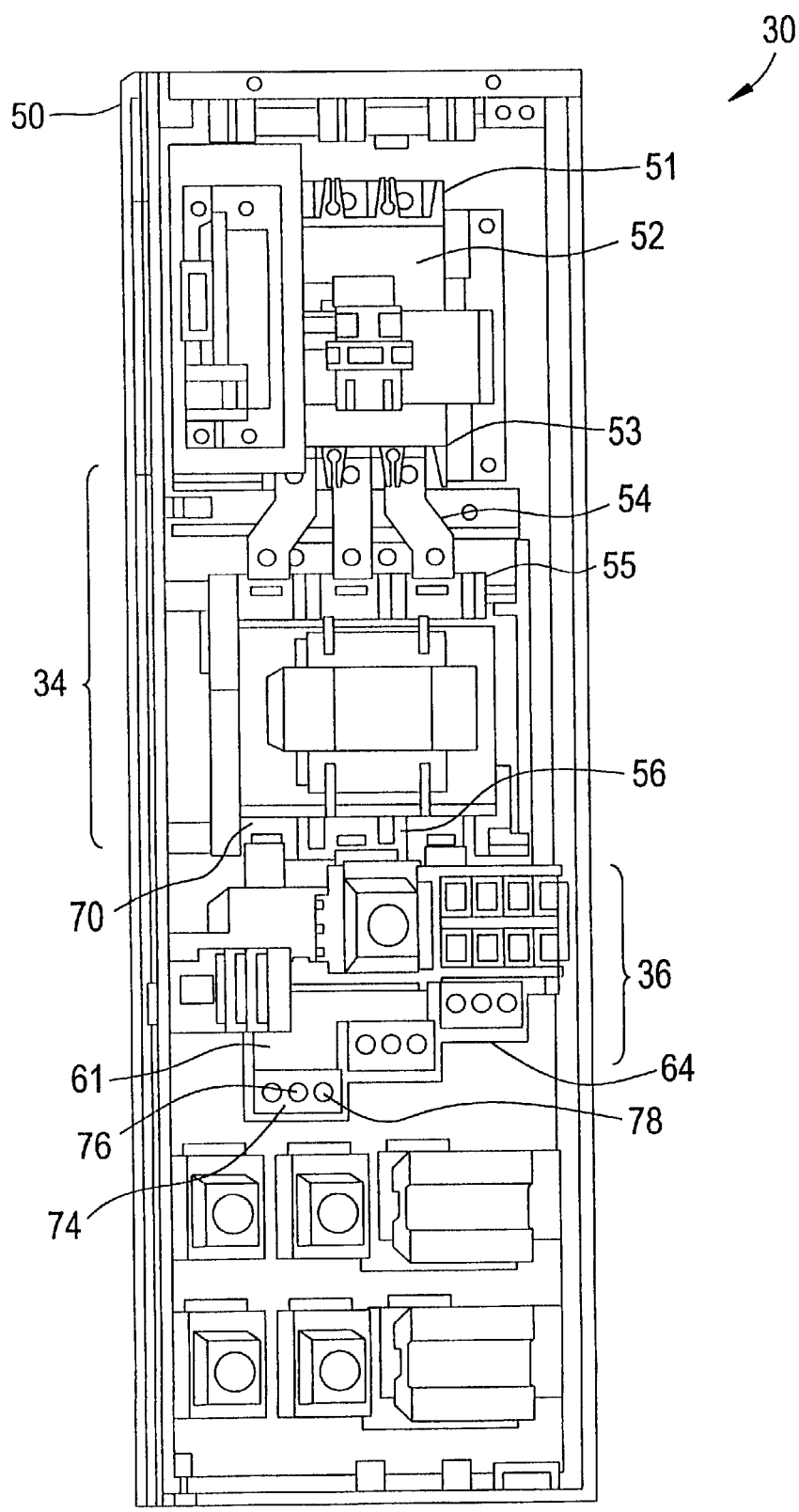
FIG. 3 is a schematic view of a drawout having a vertical stab housing, a circuit interrupting device, a distribution power load circuit, and a load terminal, of the present invention.
Figure 4:
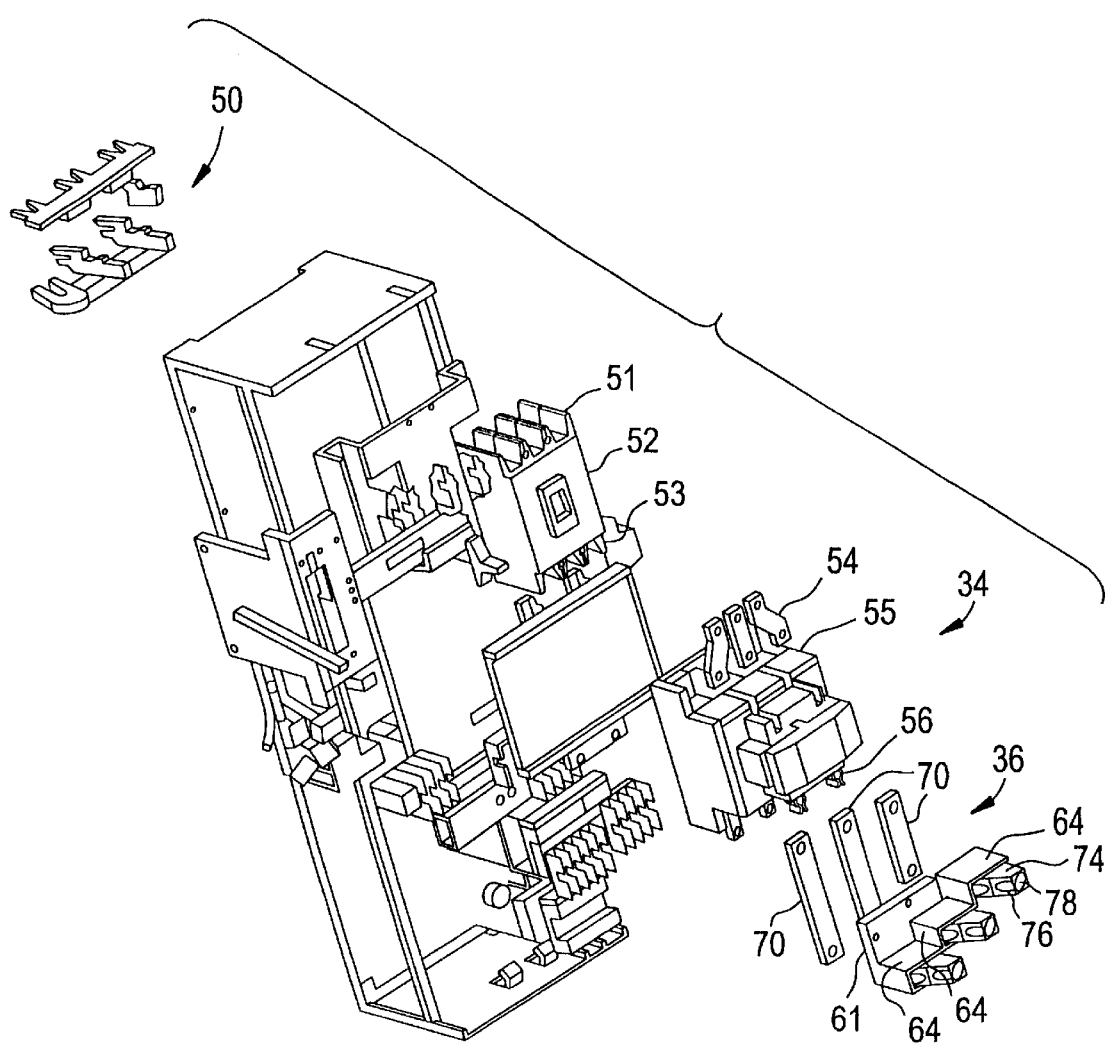
FIG. 4 is an elevated and exploded view of the drawout shown in FIG. 3.

Referring to FIGS. 3 and 4, drawout box 30 is shown in greater detail. A drawout stab unit 50 receives power from bus bars (not shown). The construction of drawout stab unit 50 is well known in the art. Bus straps (not shown) connect drawout stab unit 50 to a line side 51 of a switching device or circuit interrupting device 52. A load side 53 of circuit interrupting device 52 is connected by second set of bus straps 54 to a line side 55 of distribution power load circuit 34. A third set of bus straps 70 connects a load side 56 of distribution power load circuit 34 to load terminal assembly 36.

Figure 5:
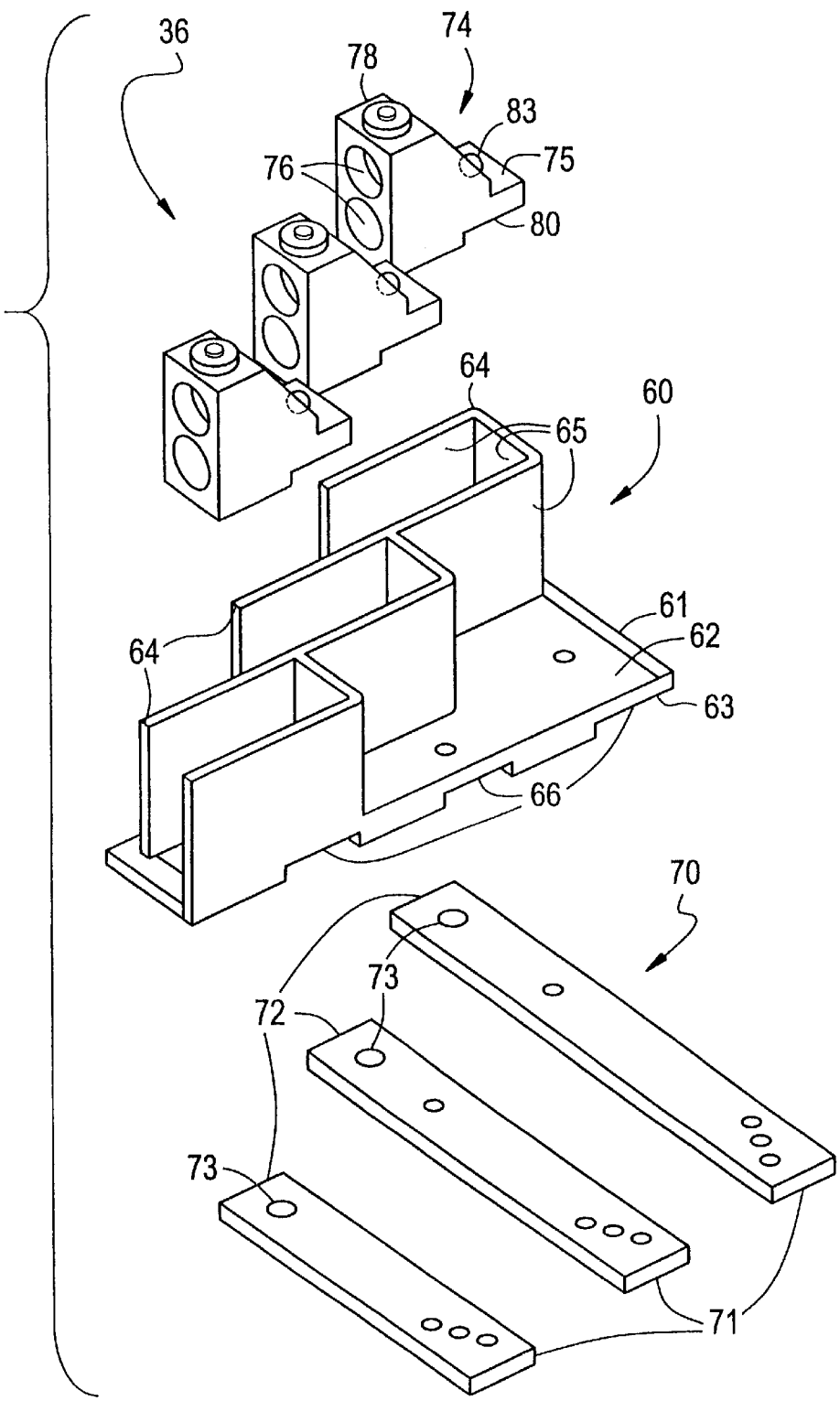
FIG. 5 is an elevated and exploded view of the load terminal assembly, of the present invention.

Load terminal assembly 36 is illustrated in FIG. 5. Load terminal assembly 36 is comprised of a bus brace 60, bus straps 70, and lugs 74. Bus brace 60 is comprised of a base plate 61 and a plurality of lug-engaging receptacles 64. Base plate 61 has an upper surface 62 and a lower surface 63. Receptacles 64 are positioned on upper surface 62 of base plate 61. Each receptacle 64 has three walls 65 positioned to be substantially perpendicular to base plate 61. The bottoms of walls 65 are fixedly attached to upper surface 62 of base plate 61. Openings (not shown) extend completely through base plate 61 in order to allow lugs 74 received in receptacles 64 to contact bus straps 70. Receptacles 64 are configured and positioned such that the open sides of receptacles 64 all face in the same direction and accept lugs 74 from that direction. Receptacles 64 may be configured to from a rectangle, or, as shown, receptacles 64 may be configured to form a staggered line.

Lower surface 63 of base plate 61 has channels 66 disposed in it. Channels 66 are configured, positioned, and dimensioned to receive bus straps 70. Bus straps 70 have first ends 71 and second ends 72. First ends 71 are secured to load side 56 of distribution power load circuit 34, while second ends 72 are secured to lower surface 63 of base plate 61. In a preferred embodiment, distribution power load circuit 34 would be a starter. Openings in the bottoms of receptacles 64 allow bus straps 70 to be in physical contact with lugs 74 when lugs 74 are received in receptacles 64.

Lugs 74 are dimensioned to be snugly received in receptacles 64 thus preventing lugs 74 from turning within receptacles 64. Lug 74 has ports 76 for receiving output cables 38. A screw 78 extends into port 76 from an adjacent and perpendicularly disposed surface of lug 74. This adjacent and perpendicularly disposed surface is positioned on lug 74 to be exposed when lug 74 is received in receptacle 64. Lug 74 furthermore has a first notched out portion 75 on one side and a second notched out portion 80 on its opposing side. A hole 83 extends from first notched out portion 75 completely through lug 74 to second notched out portion 80. A fastener (not shown) extends from first notched out portion 75 completely through hole 83 and is received by hole 73 in bus strap 70. Securement of fastener locks bus strap 70 into place on load terminal assembly 36.

Cable 38 extends out of lug 74 and out of open side of receptacle 64 and away from load terminal assembly 36 so as to be perpendicularly disposed to a longitudinal axis of bus strap 70. Referring again to FIG. 2, it is clearly shown that cable 38 needs only a single right angle bend to be positioned to pass through an exit port 42 in the bottom of bucket 13.

Figure 6:
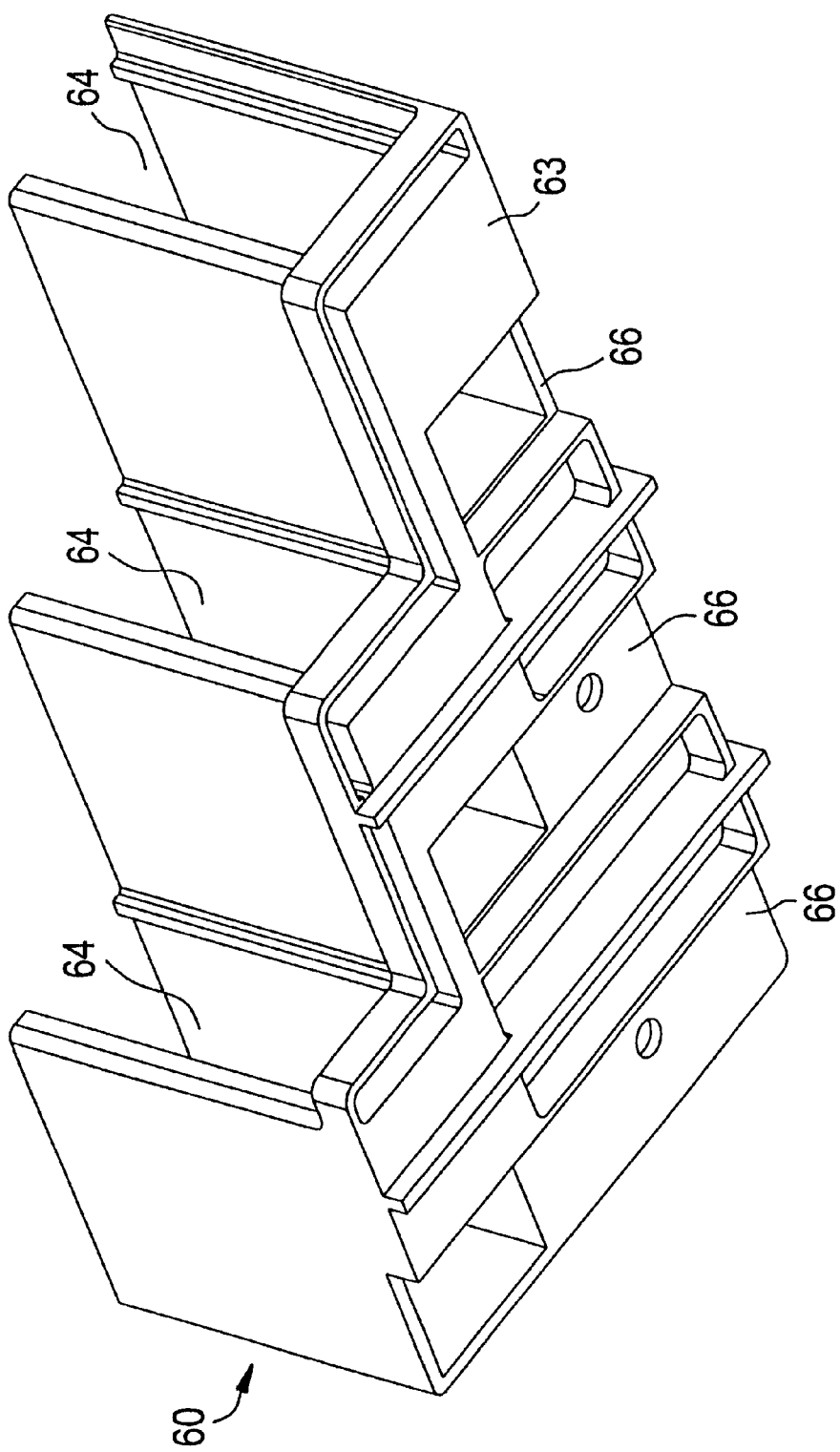
FIG. 6 is an elevated view of the bus brace of the load terminal assembly, of the present invention.

An alternate embodiment of bus brace 60 is shown in greater detail in FIG. 6. In this embodiment, bus brace 60 does not have base plate 61. In either embodiment, bus brace 60 is dimensioned to accommodate a three-phase system wherein the distribution power load circuit 34 is a 3X starter. Bus brace 60 is fabricated of a material sufficient to provide insulating properties as well as rigid support for bus straps 70 during torquing of lug 74. The distance between receptacles 64 is defined by the thickness of walls 65 of receptacles 64. This thickness is calculated to the distance between the phases. The open sides of receptacles 64 allow receptacles 64 to accommodate cabling for motor leads, while channels 66, in conjunction with raised portions on lower surface 63, provide a clamping force between bus brace 60 and bus strap 70 while retaining the anti-turn characteristics of lugs 74.

Figure 7:
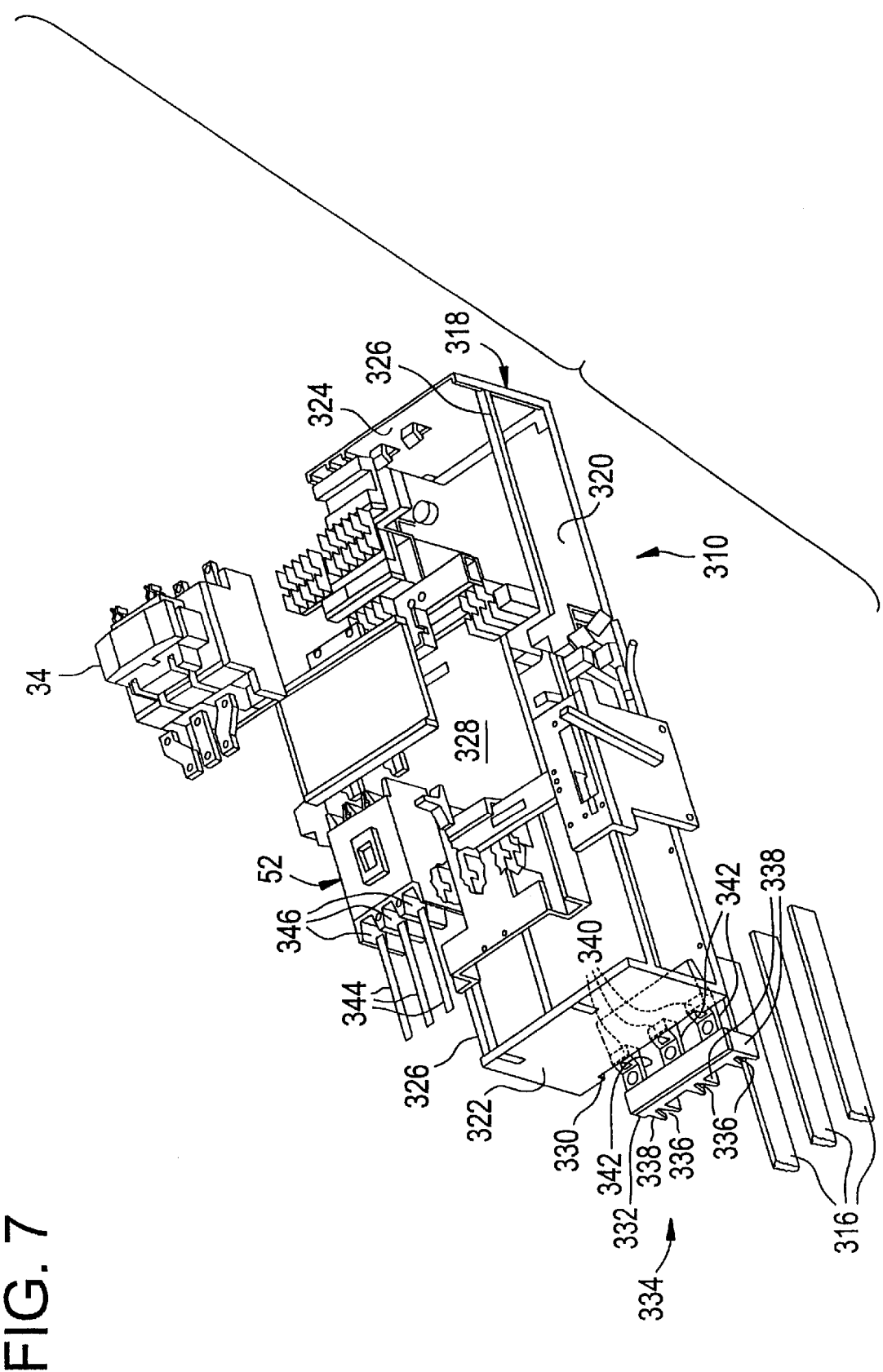
FIG. 7 is a partially exploded perspective view of a draw out unit with a lug adapter assembly of the present invention.

FIG. 7 is partially exploded view of a draw out unit 310 for mounting switching devices 52 within a switchgear unit (not shown) and electrically connecting the switching devices 52 to electrical bus bars 316. Switching devices 52 include, for example, a circuit interrupting device, a circuit breaker and a starter unit. Draw out unit 310 includes a frame 318 having a bottom 320, two ends 322, 324, and side supports 326. Switching devices 52 are mounted to a support plate 328, which, in turn, is mounted to bottom 320. A cutout portion 330 on bottom 320 and end 322 receives an insulative housing 332 for a lug adapter assembly 334. Lug adapter assembly 334 includes a plurality of clip assemblies 336 positioned within receptacles 338 formed on insulative housing 332. Housing 332 is arranged within the draw out unit 310 so that clip assemblies 336 are aligned with vertical bus bars 316. Each clip assembly 336 slidably accepts one bus bar 316, thereby providing an electrical connection to bus bars 316. Lug adapter assembly 334 also includes lugs 340, which are electrically connected to clip assemblies 336 via a conductive bar 342. Lugs 346 extend upward within frame 318 when insulative housing 332 is installed in frame 318. Lugs 340 accept wires 344, which extend from lugs 346 in switching device 52. Clip assemblies 336, conductive bars 342, and lugs 340 are constructed from electrically conductive materials such as copper or aluminum to provide a current path from the bus bars 316 to wires 344 and, in turn, to the associated switching device 52.

Figure 8:
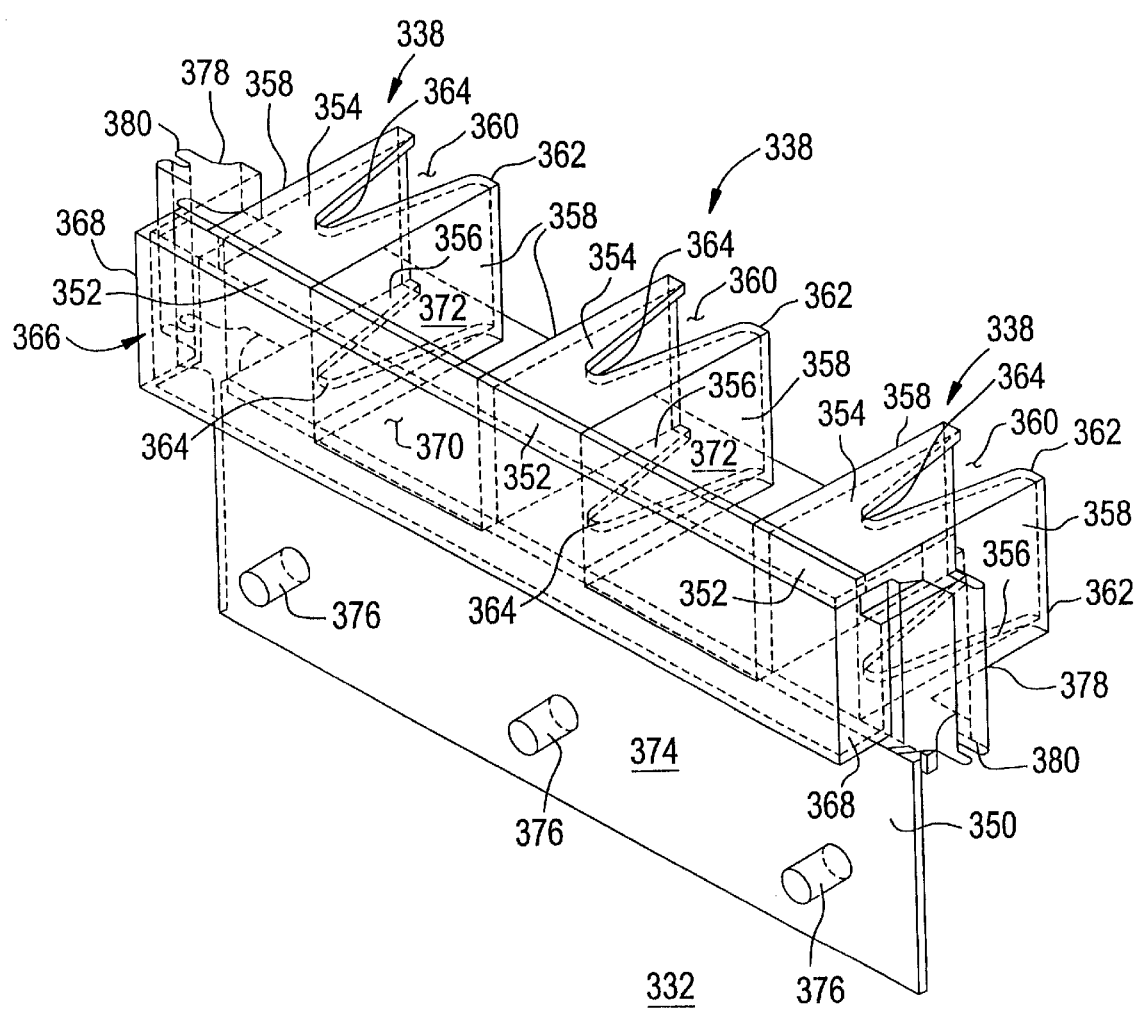
FIG. 8 is a perspective view of a housing for the lug adapter assembly of FIG. 7.

As best shown in FIG. 8, insulative housing 332 includes the plurality of receptacles 338, which extend substantially perpendicular from a top portion of a wall 350. In the embodiment shown, three receptacles 338 are used. However, it will be understood by one skilled in the art that housing 332 could include any number of receptacles 338, depending on the number of phases in the associated electrical distribution circuit. Wall 350 of housing 332 includes a substantially rectangular opening 352 at each receptacle 338. Each receptacle 338 is formed by an upper wall 354, a lower wall 356, and a pair of side walls 358, which frame rectangular openings 352. Each upper and lower wall 354, 356 includes a V-shaped cutout 360 therein. The cutout 360 extends from an edge 362 of walls 354, 356 distal to wall 350, to an arcuate apex 364 located between wall 350 and front edge 362. Arcuate apex 364 is generally aligned with the clip assemblies 336 (see FIG. 9), allowing bus bars 316 to be received by clip assemblies 336.

A cover 366 extends from a side of wall 350 opposite receptacles 338. Cover 366 includes sides 368, which are attached to opposing side edges of wall 350 and extend perpendicular to wall 350. Cover 366 also includes a wall 370, which extends from side wall 368 to side wall 368. Wall 370 of cover 366 is substantially parallel to wall 350, forming a space between the two walls 350, 370 for accepting conductive bar 342 (FIG. 7).

A pair of walls 372 extends from the wall 350 and between the receptacles 338 in the same plane as the upper wall 354 of the receptacles 338. Walls 372 are generally rectangular, and protrude no further than the arcuate apex 364. Walls 372 act as stiffening members to provide rigidity to housing 332.

The lower portion of wall 350 forms a detente surface 374, which contacts frame 318 of the draw out unit 310 (FIG. 7) when housing 332 is installed in the draw out unit 310. Located below the rectangular openings 352, three dowels 376 extend from the detente surface 374 in a direction opposite receptacles 338. When housing 332 is installed in the draw out unit 310, dowels 376 extend within holes in the frame 318 of the draw out unit 310 to secure housing 332 to the draw out unit 310. Extending outwardly from the sides of wall 350 and side walls 368 are a pair of mounting guides 378. Slots 380 within mounting guides 378 extend substantially parallel to wall 350 for slidably accepting a portion of the draw out unit frame 318, further securing housing 332 to the draw out unit 310.

Figure 9:
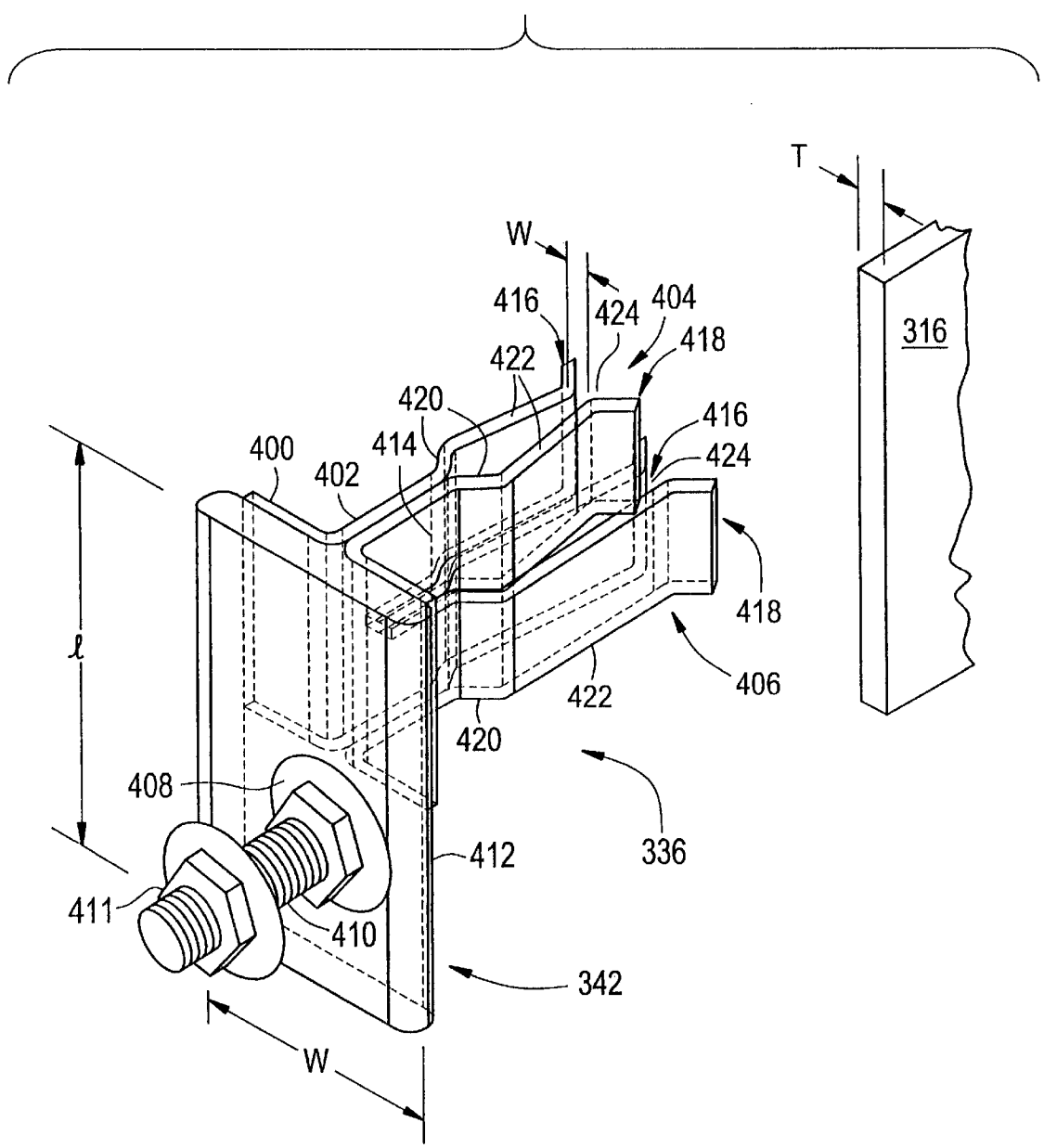
FIG. 9 is a perspective view of a clip assembly for the lug adapter assembly of FIG. 7.

Referring to FIG. 9, clip assembly 336 is shown attached to conductive bar 342. Clip assembly 336 includes a rectangular base 400 electrically connected to conductive bar 342, a root portion 402 extending perpendicularly from the base portion 400, and upper and lower clips 404, 406 extending from the root portion 402. The clip assembly 336 is mounted on the conductive bar 342 above a hole 408 passing through the conductive bar 342.

Conductive bar 342 is substantially rectangular in shape, having a length "I" greater than that of rectangular opening 352 of the housing 332 (FIG. 8) and a width "W" substantially equal to the width of the rectangular opening 352 (FIG. 8). The conductive bar 342 includes hole 408 disposed in a lower portion of conductive bar 342 for receiving a threaded bolt 410. Hole 408 is substantially square in shape for receiving a square portion on bolt 410 and thereby preventing bolt 410 from spinning within hole 408.

Rectangular base 400 is affixed to a rear surface 412 of an upper portion of the conductive bar 342. Rectangular base 400 has a width substantially equal to the width "W" of conductive bar 342 and a length substantially equal to half the length "I" of conductive bar 342.

The lower clip 406 is disposed below and extends further forward than the upper clip 404. Each clip 404, 406 extends from root portion 402. The root portion 402 includes a horizontally disposed, narrow slot 414 that extends partially into the root portion 402 between the clips 404, 406. Each clip 404, 406 is constructed from two symmetric contact arms 416, 418. Each contact arm 416, 418 depends angularly away from the other to define a first portion 420 of each contact arm 416, 418. From the first portion 420 of contact arms 416, 418, each member depends angularly inward therefrom to define a second portion 422. Furthermore, the second portion 422 of lower clip 406 is longer than second portion 422 of upper clip 404, thereby resulting in the further extension of the lower clip 406. Each contact arm 416, 418 is turned-out, defining an oblique angle therebetween for guiding clips 404, 406 onto the bus bars 316. A gap 424 is included between contact arms 416, 418 at each second portion 422. The width "W" of gap 424 is smaller than the thickness "T" of the edge of vertical bus bar 316 to be inserted within each clip 404, 406 allowing clips 404, 406 to frictionally engage bus bar 316 between contact arms 416, 418.

Referring to FIGS. 8 and 9, base 400, root portion 402, and clips 404, 406 of each clip assembly 336 are formed from two pieces of electrically conductive material, which are secured together at the root portion 402 by welding or by a mechanical fastener as is well known in the art. When the clip assembly 336 is mounted within the housing 332, the root portion 402 passes through the rectangular opening 352, and the clips 404, 406 are vertically aligned and extend horizontally from the root portion 402 within the receptacle 338.

Figure 10:
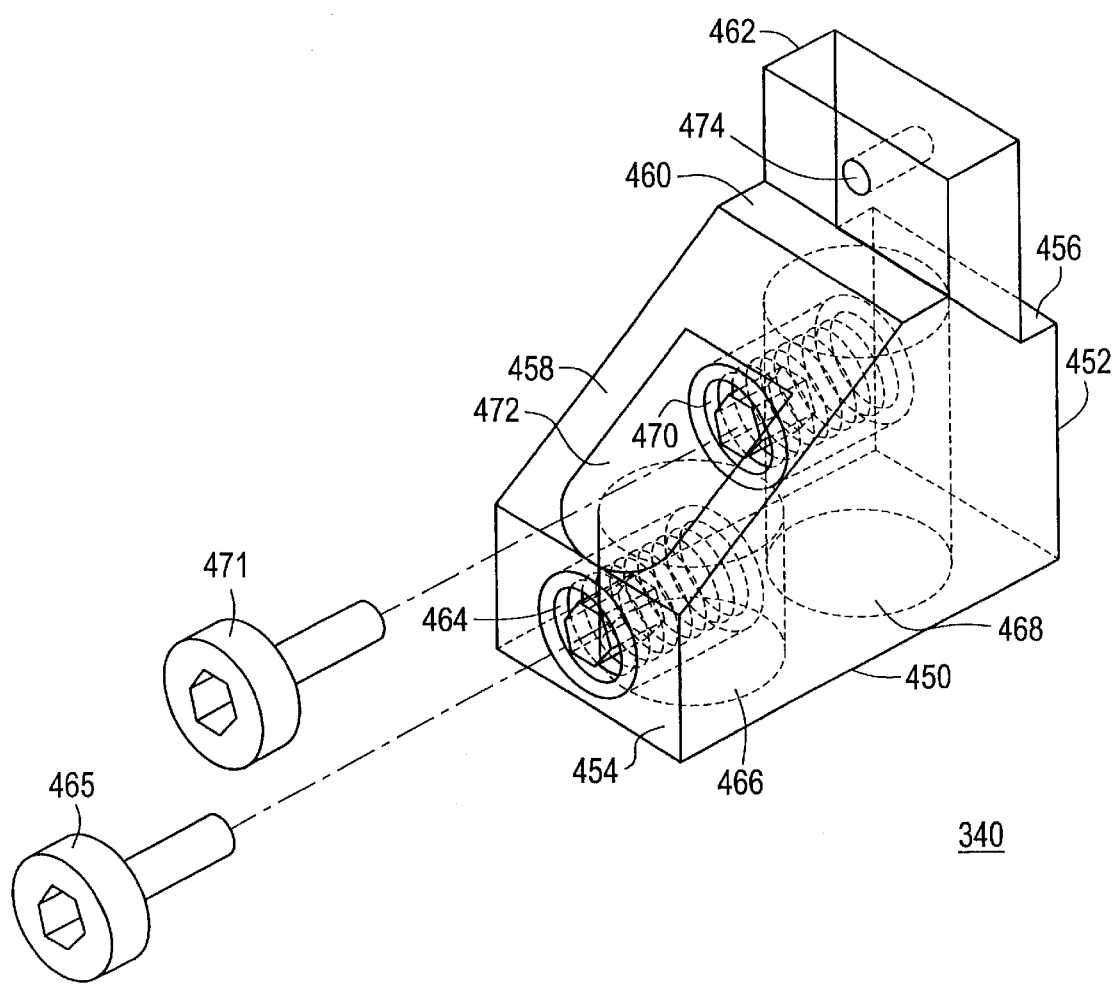
FIG. 10 is a perspective view of a lug for the lug adapter assembly of FIG. 7.

Referring to FIG. 10, an exemplary embodiment of the lug 340 of the present invention is shown. The lug 340 comprises a flat bottom surface 450 from which a rear surface 452 and an opposing front surface 454 perpendicularly depend. Front surface 454 is substantially rectangular. Rear surface 452 is planar and has a horizontal step (shoulder) 456 defining its end. The step 456 has a depth equal to the thickness of the conductive bar 342. An inclined surface 458 depends in a rearward direction from the front surface 454. A horizontally disposed surface 460 extends rearward from the inclined surface 458. A rectangular tab 462 extends upwardly between the horizontally disposed surface 460 and the horizontal step 456.

A first threaded hole 464 is positioned horizontally passing into the front surface 454 and further extending into a first through hole 466. The first through hole 466 extends from the bottom surface 450 partially through the lug 340 and is disposed approximate the front surface 454. The axes of the first threaded hole 464 and the first through hole 466 form a substantially perpendicular intersection. A set screw 465 is installed in first threaded hole 464 for securing an electrical wire in first through hole 466.

A second through hole 468 extends from the bottom surface 450 and extends partially through the lug 340. The axis of the second through hole 468 is disposed parallel to the first through hole 466 and further aligned with a plane defined by the axes of the first through hole 466 and the threaded hole 464. A second threaded hole 470 is disposed above and parallel to the first threaded hole 464 having its axis on the plane formed by the axes of the holes 464, 466 and 468. The second threaded hole 470 extends through the second through hole 450. A set screw 471 is installed in second threaded hole 470 for securing an electrical wire in second through hole 468.

Inclined surface 458 includes a cutout 472 extending vertically into the inclined surface 458. The cutout 472 passes partially into the inclined surface 458 wherein the cutout 472 intersects the second threaded hole 470. The tab 462 includes a hole 474 for receiving the retaining bolt 410 (FIG. 9).

Figure 11:
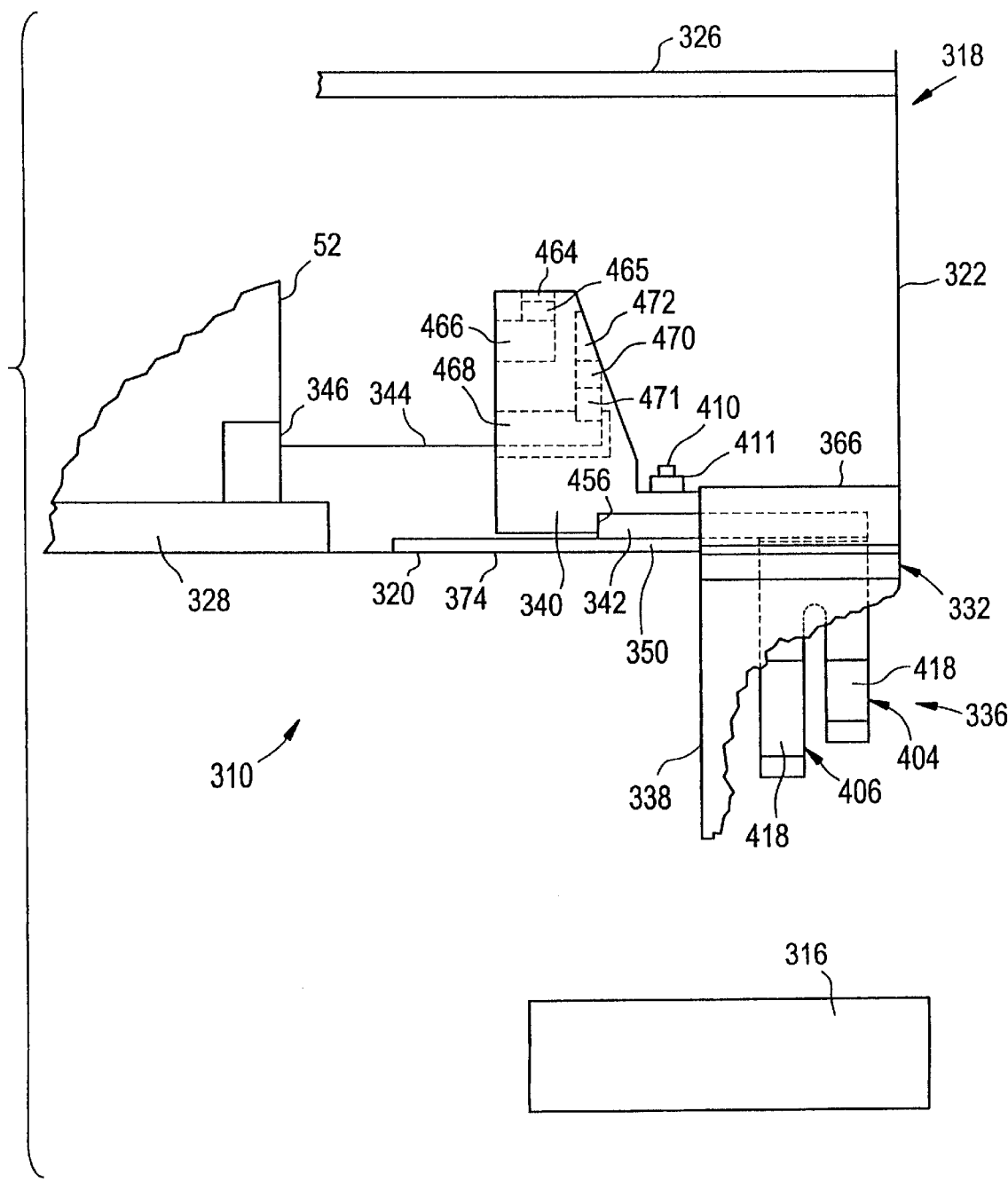
FIG. 11 is a side elevational partial cutaway view of an assembled lug adapter assembly within the draw out unit of FIG. 7.

As best shown in FIG. 11, the lug 340 is bolted to the conductive bar 342. Ends of cable 344 are inserted into hole 468 and retained therein by set screw 471. Another cable (not shown) may be secured in hole 466 in a similar manner. Lug 340 is retained at wall 350 by mounting the lug 340 on the threaded bolt 410 and retaining the lug 340 with the nut 411 thereon. Mounting the lug 340 on the conductive bar 342 of the lug assembly 334 provides a current path from the bus bars 316 to the cable 344. Step 456 on lug 340 abuts an end of conductive bar 342 for aligning lug 340 with conductive bar 342.

The conductive bar 342 is positioned flush with wall 350 and clips 404, 406 extend perpendicular to wall 350 and within receptacle 338. Each clip 404, 406 is centered within the receptacle 338, thereby being aligned with a vertical bus bar 316. Top cover 366 of insulative housing 332 resists forces developed by insertion and removal of the clips 404, 406 onto the bus bar 316.

Within each lug 340, the hole 468 for accepting wire 344 has an axis that extends in a direction towards its corresponding switching device lug 346. This arrangement allows wire 344 to extend in a substantially linear fashion between lug 340 and lug 346, with no severe bending of wire 344. Because, there is no need to accommodate the bending radius of wire 344, the distance between switching device 52 and lug 340 can be made smaller than if bending of wire 344 was required. Decreased distance between switching device 52 and lugs 340 allows frame 318 to have smaller dimensions, thus making a more efficient use of space within the draw out unit 310 and rendering the draw out unit 310 more manageable.

Referring to FIGS. 8, 9, and 11, upon insertion of the draw out unit 310 into the switchgear (not shown), bus bars 316 enter into the V-shaped cutout 360 in housing 332 and into the gap 424 formed between contact arms 416, 418 of lower clip 406. The bus bar 316 expands contact arms 41 6, 418 of the lower clip 406 before commencing entry and expansion of the contact arms 416, 418 of the upper clip 404. The insertion will continue until the detent surface 374 contacts a stop bar (not shown) of the switchgear—i.e. when insertion is complete and the bus bar 316 is fully inserted within the clip assembly 336. Staggering the clips 404, 406 reduces the insertion force needed to expand the contact arms 416, 418 by reducing the size and engagement area of each contact arm 416, 418. Indeed, an insertion force of about percent of the insertion force of a typical clip assembly is required because the clips are staggered. In addition, the use of more than one clip within each clip assembly helps to insure that each clip assembly will have more than one contact point on the bus bar.

Figure 12:
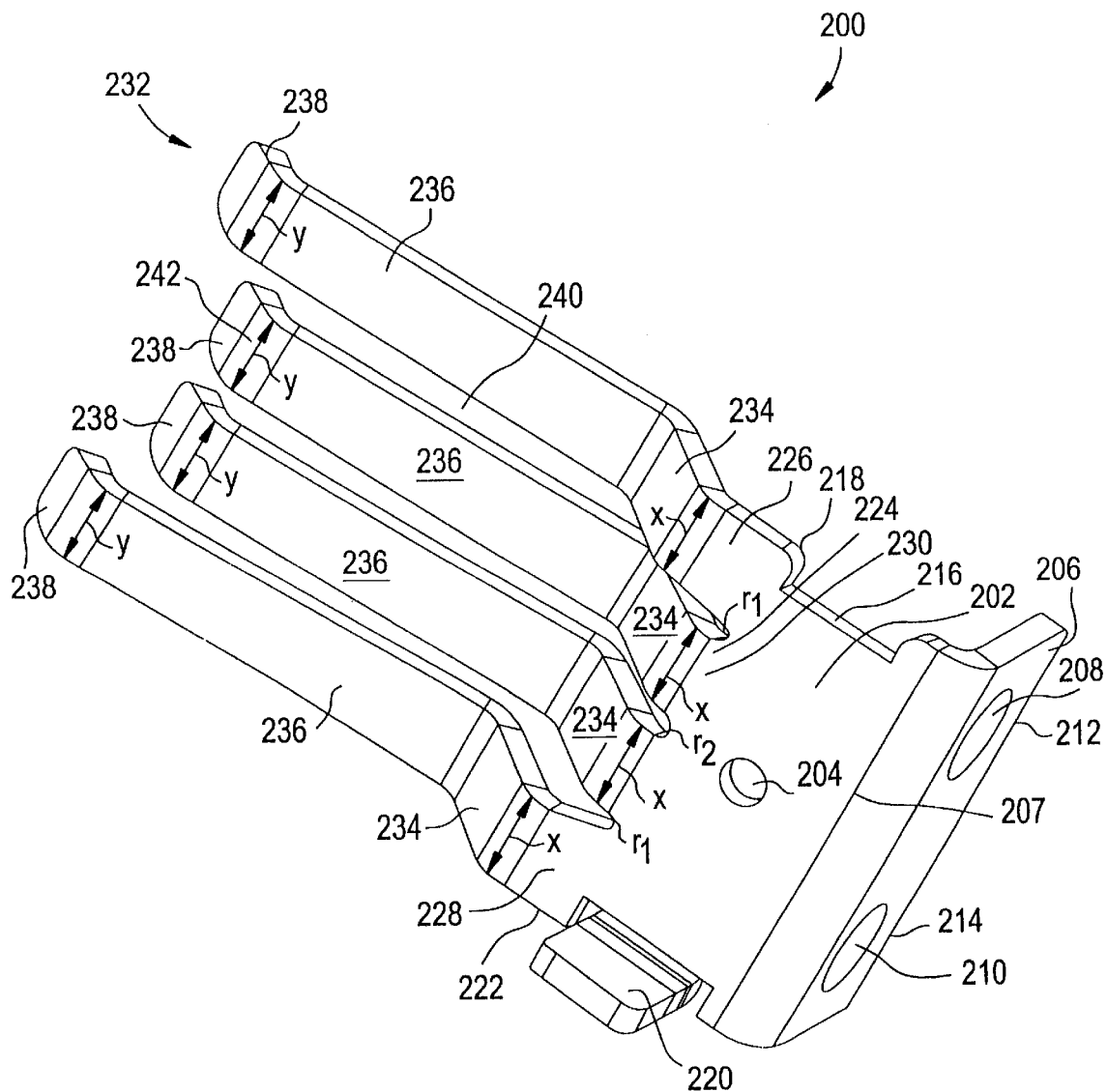
FIG. 12 is a perspective view of one side of an alternate embodiment of the clip assembly.
Figure 13:
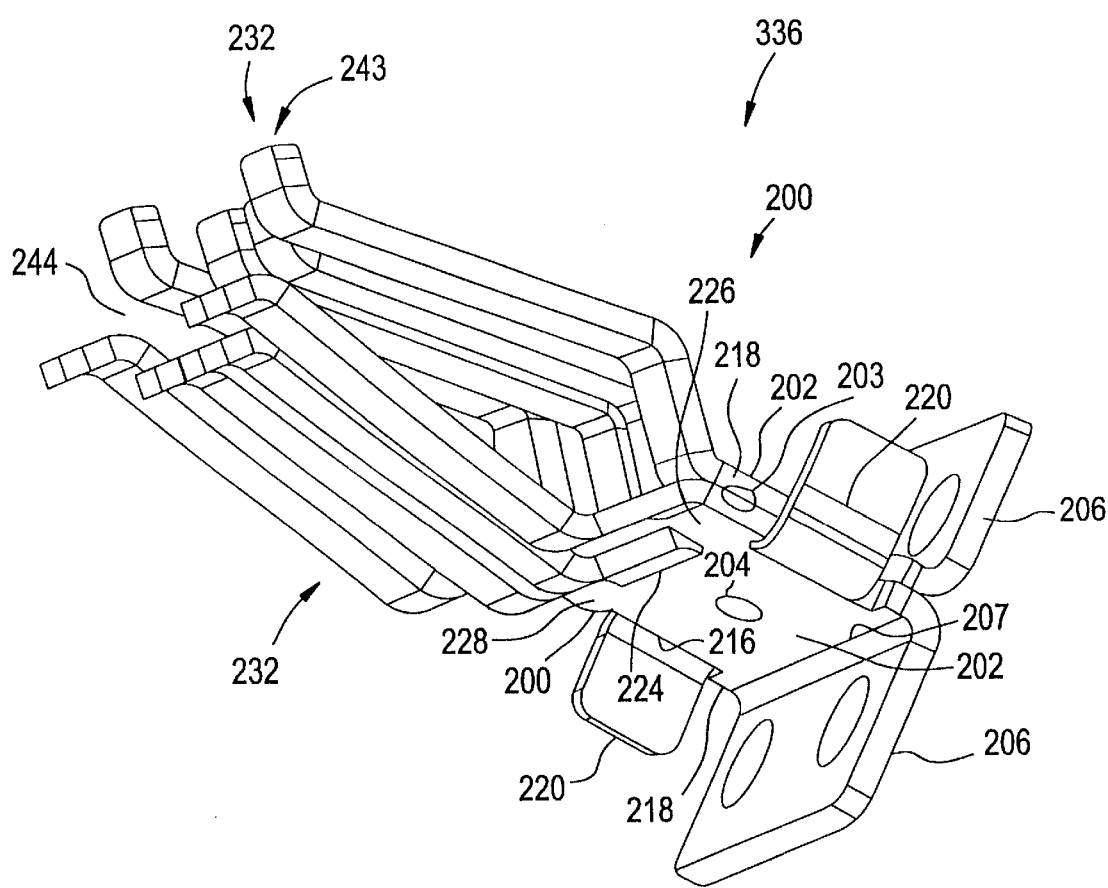
FIG. 13 is a perspective view of the alternate embodiment of the clip assembly.

Referring now to FIGS. 12 and 13, another embodiment of clip assembly 336 having four clips 243 is illustrated. FIG. 12 shows a first side 200 of clip assembly 336 having four contact arms. The side shown can be combined with a symmetrical second side 200 to produce the clip assembly 336 (see FIG. 13). Side 200 has an approximately rectangular root portion 202. The rectangular root portion 202 defines a circular aperture 204, which is preferably disposed in the center of the rectangular root portion 202. A base portion 206 depends perpendicularly from a first long edge 207 of the rectangular root portion 202. The base portion 206 is preferably the same thickness and length as the rectangular root portion 202. The base portion 206 defines two circular apertures 208, 210, which are preferably disposed approximately centrally within the top half 212 and the bottom half 214 of the base portion 206. The rectangular root portion 202 has a notch 216 disposed on a first short edge 218 of the rectangular root portion 202. A rectangular tab 220 depends perpendicularly forward along a second short edge 222 of the rectangular root portion 202. The tab 220 extends far enough from the rectangular root portion 202 to enable bending of the tab 220 over the second side 200 of the clip assembly 336 (see FIG. 13). The notch 216 is wide enough and deep enough to accept the width and the thickness of the tab 220 on the second side 200 of clip assembly 336.

A second long edge 224 of the rectangular root portion 202 has an upper protrusion 226 and a lower protrusion 228, with a recessed portion 230 disposed therebetween. Four contact arms 232 depend from the second long edge 224 of the rectangular root portion 202. Each contact arm 232 comprises a first portion 234 disposed against the second long edge 224 and depending angularly backwards from a plane formed by the root portion. From the first portion 234, each contact arm 232 depends angularly forward therefrom to define a second portion 236, which terminates with a turned-out portion 238 that angles backward. Turned-out portions 238 define oblique angles that guide the clip assembly 250 onto the bus bar 316. Each contact arm 232 is trapezoidal in shape, with the width "x" of the first portion 234 along the second long edge 224 being greater than the width "y" of the free end at the turned-out portion 238. The trapezoidal-shape of the contact arms 232 prevent rotation of the contact arms 232 with respect to the root portion 202.

The contact arms 232 depend from the second long edge 224: one contact arm 232 from the upper protrusion 226, one contact arm 232 from the lower protrusion 228, and two contact arms 232 from the recessed portion 230. The contact arms define three narrow slots 240, which extend from the turned-out portions 238 to radii formed on second long edge 224. The radius formed between contact arms 232 is greater than the radii formed between contact arms 232 and upper and lower protrusions 226, 228. The different radii allow the material stress all contact arms to be approximately equal when bus bar 316 is slidably engaged by the clip assembly 336. In other words, the design of radii $r_1$ and $r_2$ is such that the material stress in similar portions of each contact arm 232 will be approximately equal. It will be appreciated that the attachment of two of the contact arms 232 to the recessed portion 230, and two of the contact arms to the upper and lower protrusions 226, 228 causes the contact arms 232 attached to the upper and lower protrusions 226, 228 to extend outward from the rectangular root portion 202 further than the contact arms 232 that are attached to the recessed portion 230.

Turning now to FIG. 13, assembly of the clip assembly 336 is done by first fitting together the two sides 200 in such a way so that the rectangular root portions 202 are placed proximate each other, with the circular apertures 204 aligned, and with base portions 206 lying in the same plane and extending in opposite directions. The tang 220 of each side 200 is disposed against the first short edge 218 and within the notch 216 of the other side 200, and the long edges 207, 224 of each side 200 are disposed adjacent to the same long edges 207, 224 of the other side 200.

It will be appreciated that this fitting together of two sides 200 will align opposing contact arms 232 in symmetrical pairs that define four individual clips 243, which in turn define four gaps 244. Additionally, the individual rectangular root portions 202 of the two sides 200 will together form a single clip assembly root 203. As in the previous embodiment, the gap 244 will be narrower than the width of the bus bar 316. The individual clips 243 that depend from either of the protrusions 226, 228 will extend from the clip assembly root 203 a greater distance than the clips 243 that depend from the recessed portion.

To facilitate the proper and secure joining of the two sides 200, a rivet or similar fastening device (not shown) may be inserted through the circular apertures 204 disposed in the rectangular root portions 202. The use of a fastener will facilitate the proper alignment of the two sides 200, and will supplement the effectiveness of the rectangular tangs 220. To complete the assembly, tang 220 on one side 200 is bent over the rectangular root portion 202 of the other side 200 so that a portion of the tang 220 is disposed in a parallel plane to, and in intimate contact with, the rectangular root portion 202 of the other side 200. The same process is then performed on the other tang 220.

The clip assembly 250 of this embodiment can be attached to a conductive bar 342 (see FIGS. 7, 9, and 11) by four bolts and four nuts or other connecting devices (not shown) that pass through the circular apertures 208, 210 in the base portion 206 of each side 200 of the clip assembly 336. The conductive bar 342 in this embodiment has holes (not shown) that align with the circular apertures 208, 210 in the clip assembly 336. The clip assembly 336 can also be fastened to the conductive bar 342 by spot welding, or any other means well known in the art, as in the first embodiment. The clip assembly 336 of this embodiment can be used in the lug adapter assembly 334 described above, and in any manner consistent therewith.

Upon installation of this embodiment of the present invention on a bus bar 316, the two protruding clips 243 will engage the bus bar 316 before the two recessed clips 243. As in the first embodiment, the force required to properly mount the clip assemblies 336 on the bus bar 316 is thereby significantly reduced.

The invention provides the advantage of requiring less force for insertion of the clips onto the bus bars, thus allowing a switching device to be inserted by hand while dispensing with the need for complex racking mechanisms. The invention further requires less space for housing the switching device because there is no racking mechanism. Furthermore, the lug of the present device provides for attachment of electric cable to the switching device without the need for large bend radii, allowing the size of the draw out unit to be reduced.

As shown in FIGS. 14–15, for meeting with electrical codes, the previous drawout unit 90 was a minimum of 20 inches in width and 10 inches in depth. This minimum depth and width are necessary for providing the required space for cable bending radius. The drawout unit 90 as shown includes circuit breaker 94 with line side bus connections 95 and load side bus connections 93. Additionally, the previous design of a drawout unit 90 does not allow service of equipment without removing the main power source because of the bolted mounting plate 92 which fixes the circuit breaker 94 to the enclosure 96 shown in FIG. 14 and the non-drawout bolted connection 98 to the vertical bus shown in FIG. 15. Further shown in FIG. 15, the circuit breaker handle housing 100 supporting handle 102 is fixed to a side of the enclosure 96.

Figure 16:
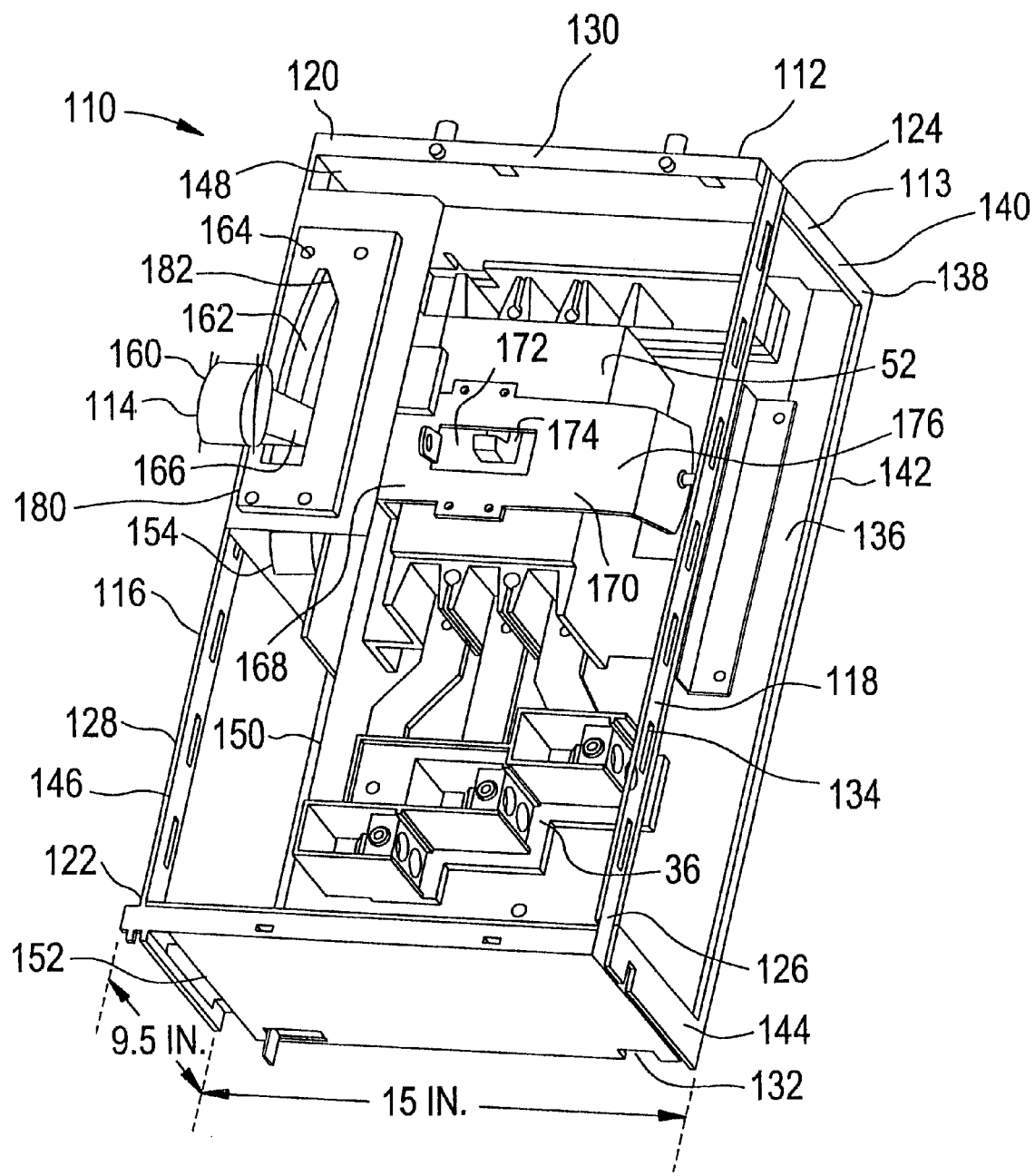
FIG. 16 is a top perspective view of a drawout assembly of the present invention.
Figure 17:
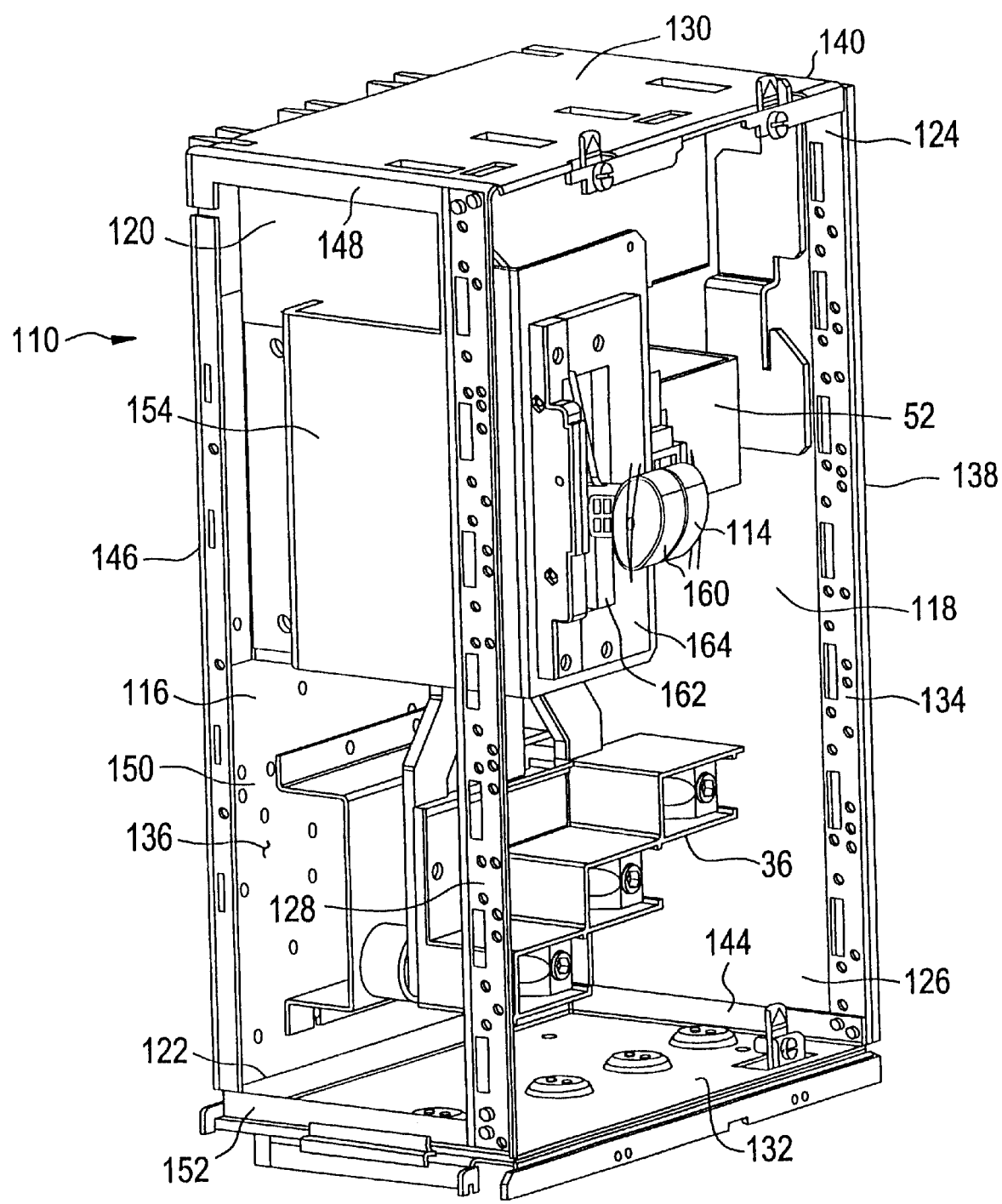
FIG. 17 is a left side perspective view of a drawout assembly of the present invention.

The improvements described above to the terminal assembly 36 enable the use of a smaller drawout unit 110 as shown in FIGS. 16 and 17. As shown in FIG. 16, the enclosure 112 shown is reduced in width to 15 inches, and in depth to 9.5 inches. The previously bolted mounting plate 92 which fixed the circuit breaker 94 to the enclosure 96 is replaced with a new drawout bucket, or saddle, assembly 112 which allows servicing of equipment without removing the main power source. The non-drawout bolted mounting plate 92 to the vertical bus is replaced with a new 600 Amp drawout stab assembly. The handle 114 is further redesigned for the drawout unit 110.

The redesigned bucket assembly 112 allows for the ability to service an electrical device within the bucket 113 by simply removing the bucket 113 thus permitting the motor control center to remain active. The bucket assembly 112 includes first and second preferably parallel sides 116, 118. Each side 116, 118 includes a first end 120, 124 and a second end 122, 126, respectively. The first side 116 is adjacent the redesigned circuit breaker handle 114, more fully described below. The first side 116 includes a top bar 128 which connects a third side 130 to a fourth side 132, the third and fourth sides 130, 132 being preferably parallel to each other and preferably perpendicular to the first and second sides 116, 118. The second side 118 also preferably includes a top bar 134 which connects the third and fourth sides 130, 132. The bucket assembly 112 includes the drawout base 136 to which the circuit breaker 52 and load terminal assembly 36 are mounted. It is here noted that the distribution power load circuit 34 is not included in FIGS. 16–17, but the bucket 113 is designed to incorporate such a distribution power load circuit 34. The periphery 138 of the second side 118 is thus defined by the top bar 134, a second side edge 140 of third side 130, the second side edge 142 of drawout base 136, and the second side edge 144 of fourth side 132. Without any blocking walls, the second side not only provides an egress for exiting output cables from terminal assembly 36, but also allows for the customer to service the unit 110 without disconnecting the incoming power. Similarly, the periphery 146 of the first side 116 is defined by the top bar 128, the first side edge 148 of the third side 130, the first side edge 150 of the drawout base 136, and the first side edge 152 of the fourth side 132. The handle unit 114 includes a first side mounting plate 154 which is partially positioned within the periphery 146 of the first side 116. Otherwise, the first side 116 is open as is the second side 118.

Figure 19:
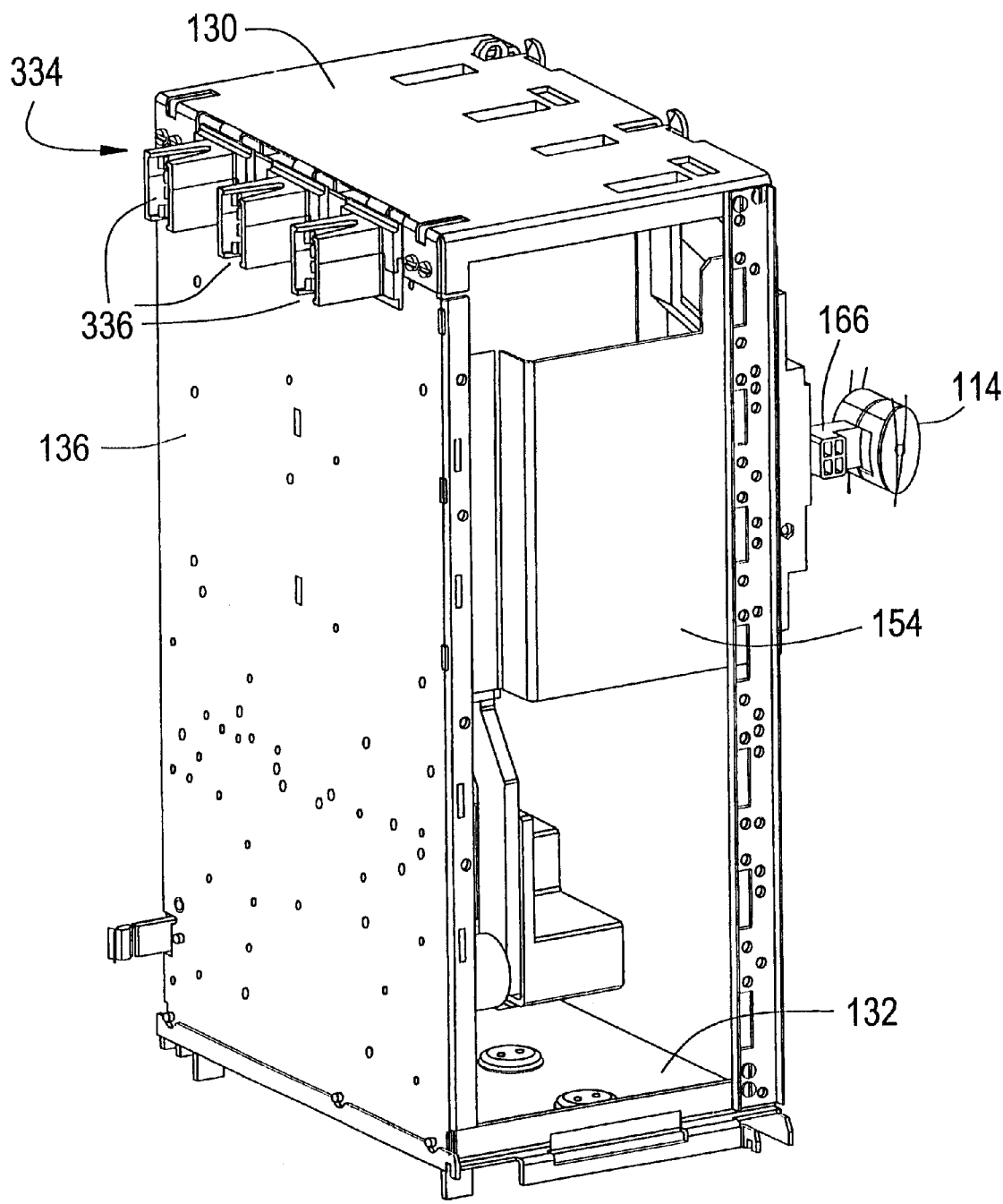
FIG. 19 is a bottom perspective view of the drawout assembly of FIGS. 16–17.

As shown in FIGS. 17 and 19, the first side mounting plate 154 for the handle 114, while positioned within the periphery 146 of the first side 116, is preferably connected to the base 136, as opposed to the side of the enclosure as was previously done as shown in FIG. 15. This connection to the back saddle plate or base 136 is preferably accomplished through bolts, although other connection devices are within the scope of this invention.

Figure 18:
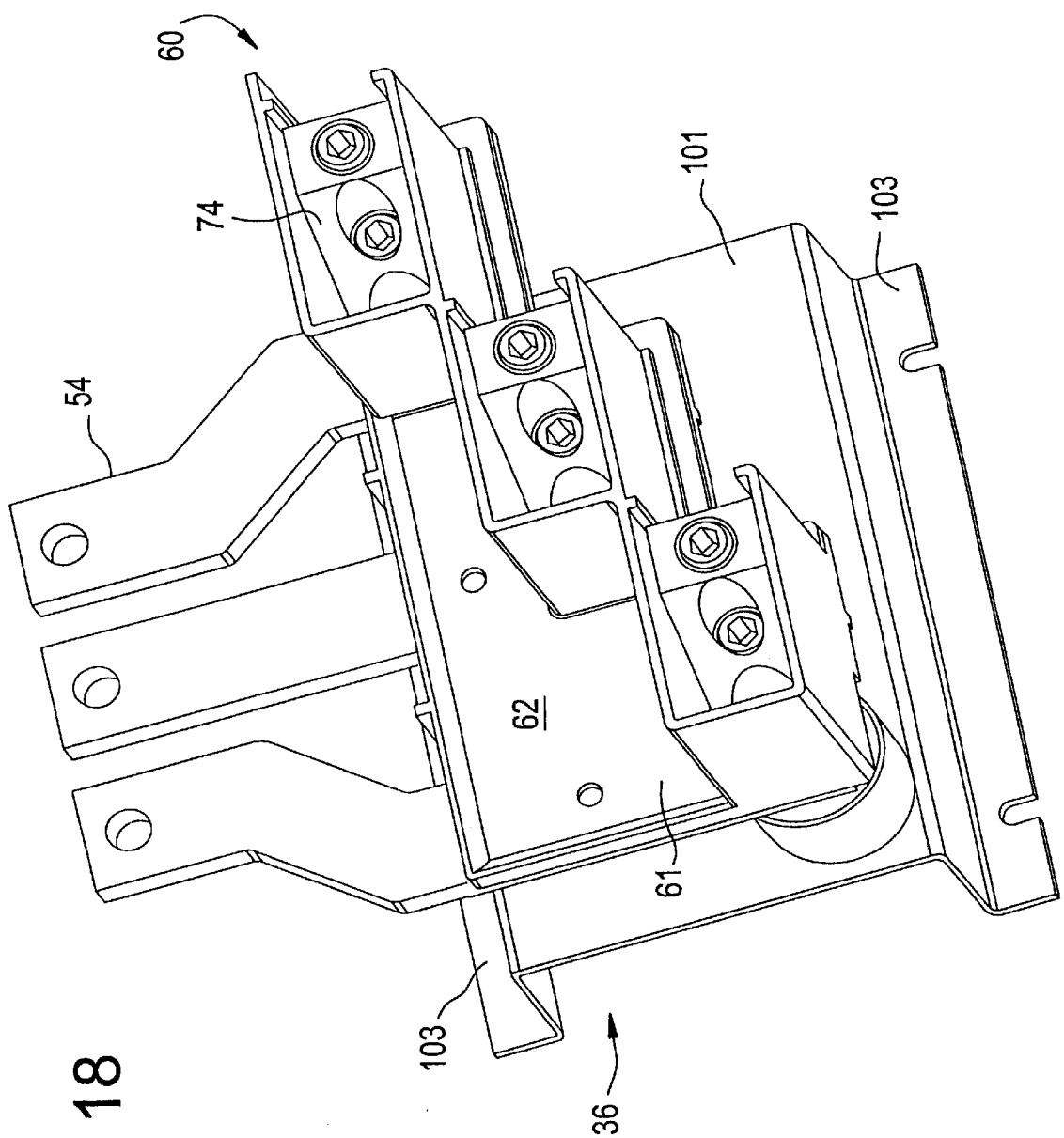
FIG. 18 is top perspective view of a terminal assembly for use in the drawout assembly of FIGS. 16–17.

FIG. 18 shows the terminal assembly 36 as modified for the drawout unit 110 which does not include the distribution power load circuit 34. The second set of bus straps 54 connect directly to the bus brace 60 as opposed to the third set of bus straps 70 as previously described in FIGS. 4 and 5. The terminal assembly 36 is further mounted to a raised support platform 101 which in turn is mounted to base 136 through legs 103 such that the terminal assembly 36 can be easily removed without removing the entire bucket assembly 112.

Figure 20:
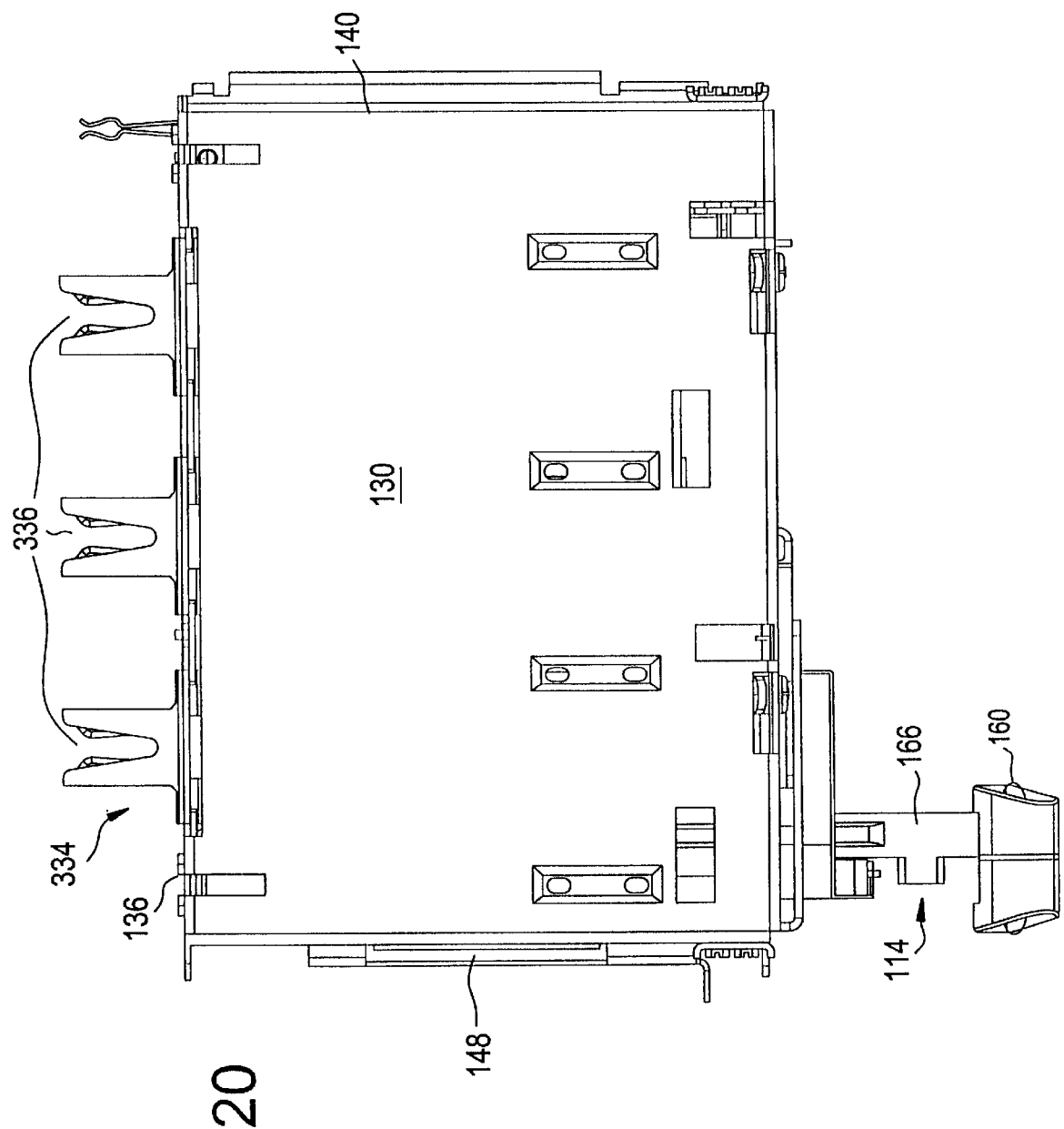
FIG. 20 is an end plan view of the drawout assembly of FIGS. 16–17.
Figure 21:
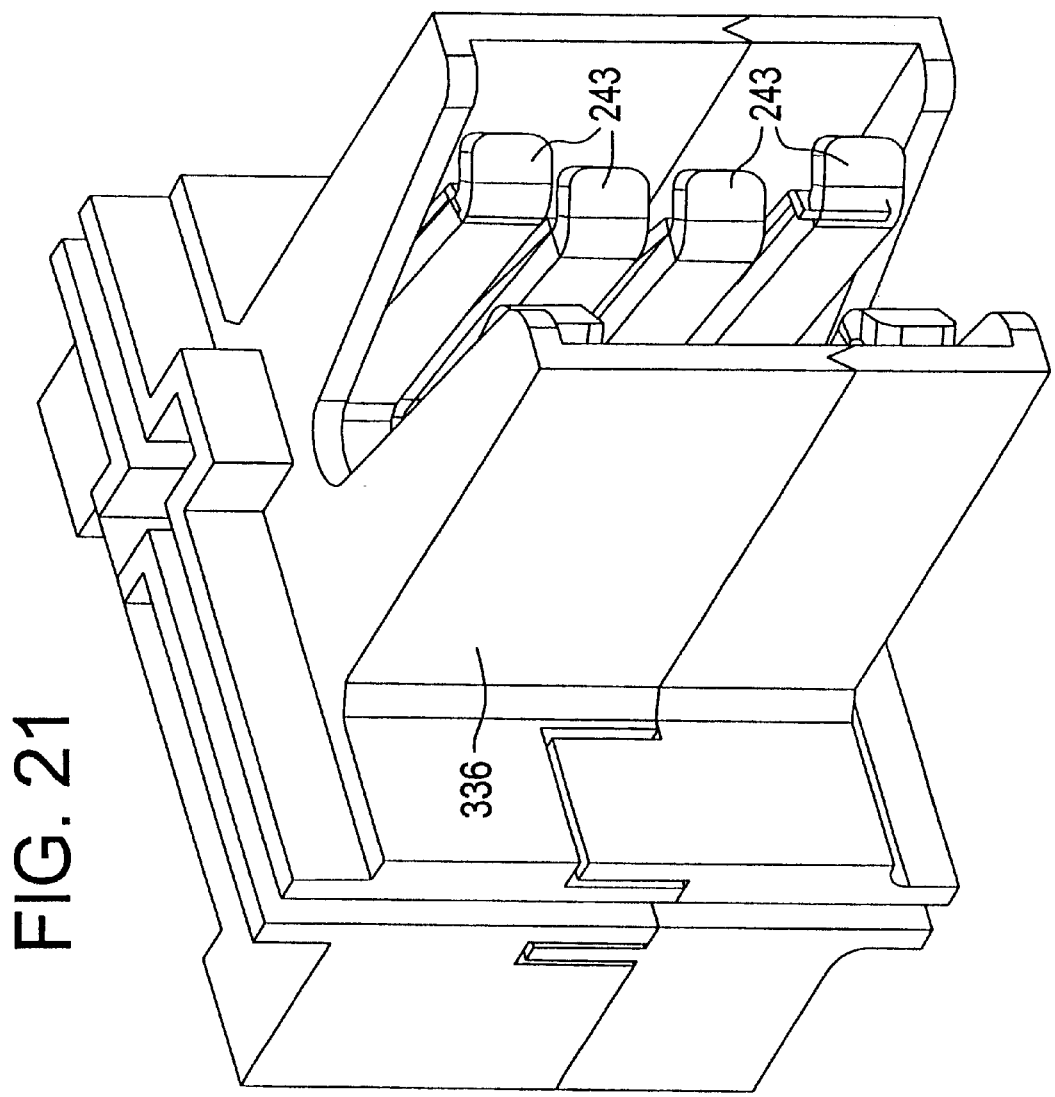
FIG. 21 is a perspective view of a clip assembly as shown in FIGS. 19–20.

As shown in FIGS. 19 and 20, the drawout unit 110 preferably includes the lug adapter assembly 334 having three clip assemblies 336 as described with respect to FIGS. 7–13. The clip assemblies 336 extend generally perpendicularly from the base 136 and adjacent the third side 130 as shown. FIG. 21 shows the clip assembly 336 which is used in the drawout unit 110 using the embodiment having four clips 243 as shown and described in FIGS. 12 and 13.

Figure 22:
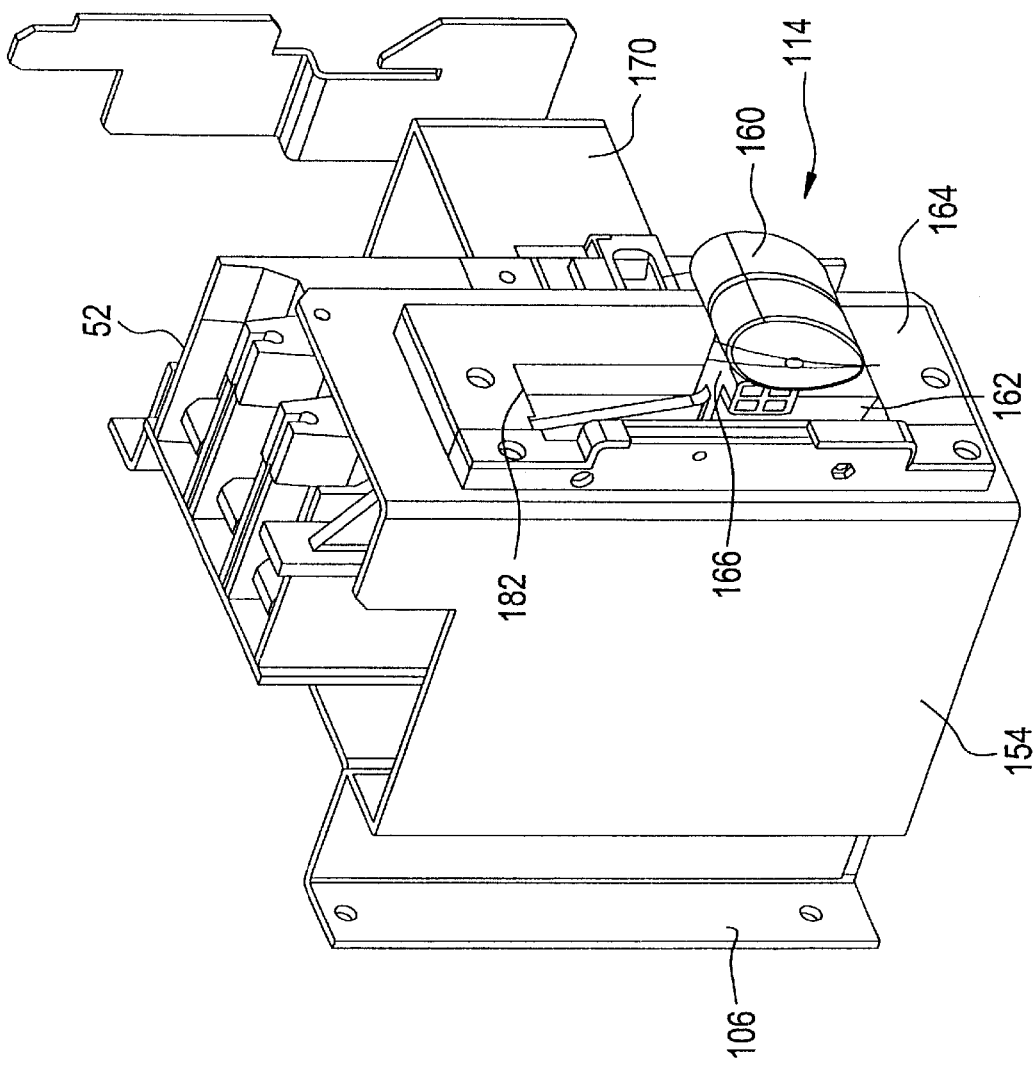
FIG. 22 is a left perspective view of a drawout handle assembly for the drawout assembly of FIGS. 16–17.
Figure 23:
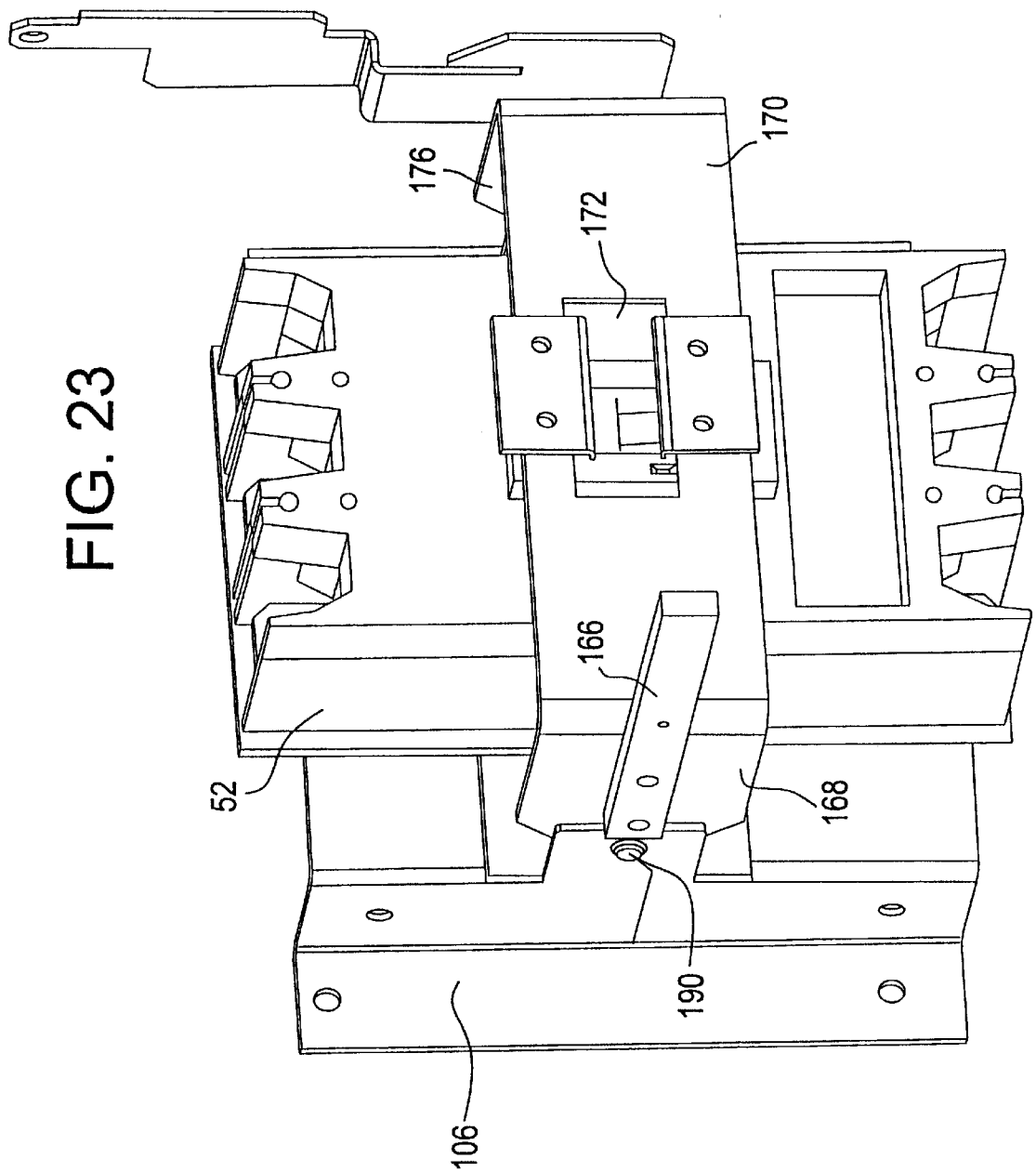
FIG. 23 is a left perspective view of the drawout handle assembly of FIG. 22 with the operable handle portion removed; and, FIG. 24 is a right perspective view of the drawout handle assembly of FIG. 23.
Figure 24:
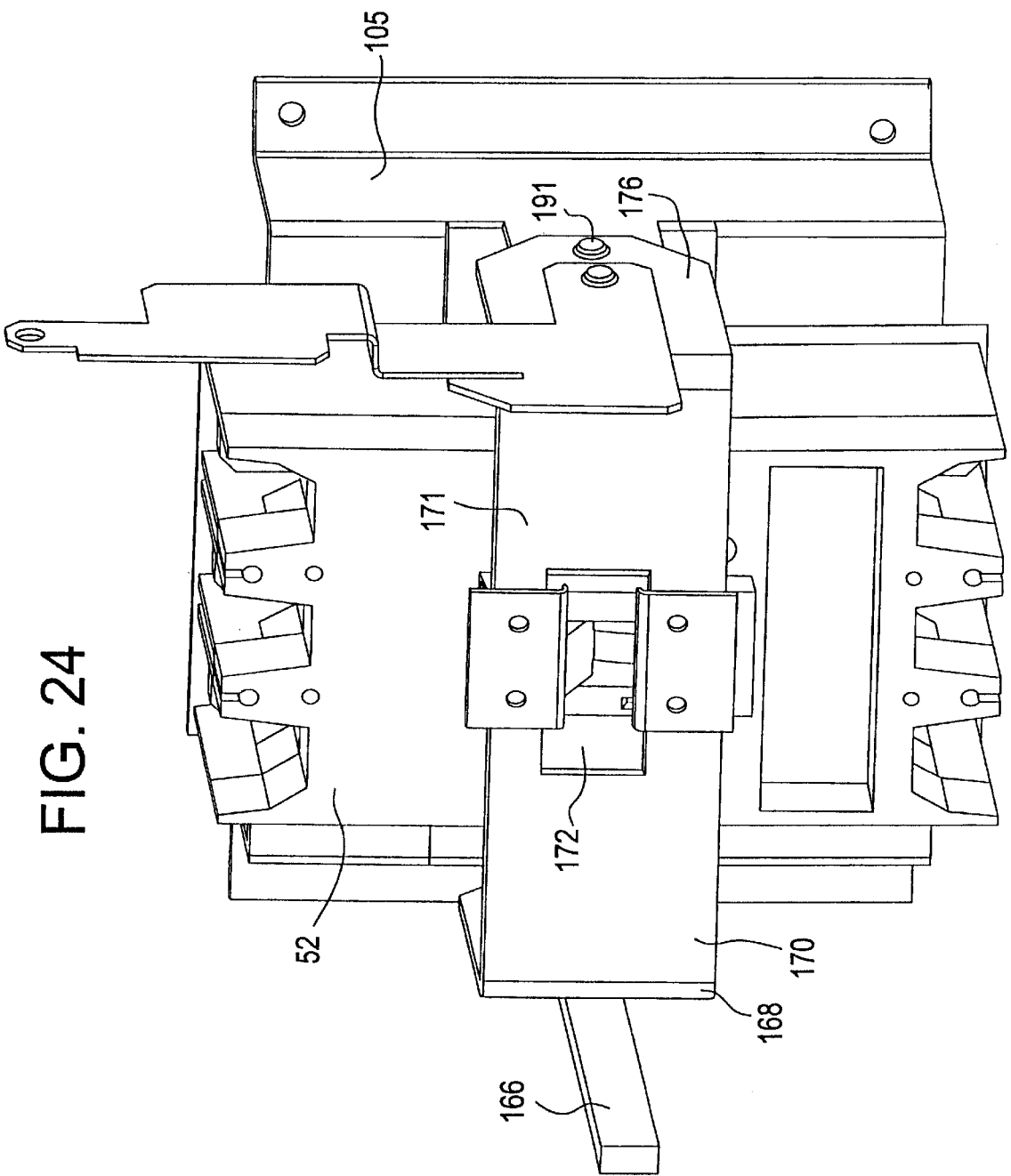

Turning now to FIGS. 22–24, and with reference to FIGS. 16–17, the previously described first side mounting plate 154 is shown connected to a mounting leg 106 for attachment to the base 136. The redesigned drawout handle 114 of the present invention includes a user operable handle portion 160. A handle slot 162 is formed within handle plate 164. The handle portion 160 connects to a stem 166 which passes through the handle slot 162. The stem 166 connects to a first side 168 of a circuit breaker handle abutting lever 170. The abutting lever 170 includes a handle slot 172 for the circuit breaker handle 174. The abutting lever 170 also includes a second side 176 which is pivotally connected at pivot 191 to a platform 105 which is connected to the base 136. When the drawout handle 114 is moved to an off position as shown in FIGS. 16, 17, and 22, with the handle portion 160 moved towards the off side 180 of the handle slot 162, then the abutting lever 170 moves towards the direction of the fourth side 132 to push the circuit breaker handle 174 in a correspondingly off position. When the drawout handle 114 is moved to an on position, towards the on side 182, of the handle slot 162, then the abutting lever 170 moves in the direction of the third side 130 to push the circuit breaker handle 174 in a correspondingly on position. Thus, movement of the drawout handle 114 is transferred through the abutting lever 170 to the circuit breaker handle 174.

FIGS. 23–24 shown the handle portion 160, handle plate 164, and first side mounting plate 154 removed. Stem 166 is shown fixedly secured to the abutting lever 170 which in turn is connected at pivot point 190 for pivotal movement with respect to the base 136. The abutting lever 170 is shown as preferably including a generally U-shaped construction with a top plate hovering over the circuit breaker (i.e. switching device 52) and connected substantially perpendicularly to first and second sides 168, 176. The design of the handle 114 with connection to the back base 136 as opposed to a side of the bucket assembly 112 further assists in servicing the drawout unit 110.

Thus, an improved drawout unit 110 has been described which incorporates a terminal assembly 36, clip assemblies 336, reduced width and depth bucket enclosure assembly 112 with open sides for exiting cables and servicing, improved handle assembly 114, and platform connections to base plate 136 for allowing the service of equipment without removing the main power source.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A drawout box for a motor control center, the drawout box comprising:
    a drawout base having a first side edge, second side edge, third side edge, and fourth side edge,
    a first side having a first side periphery,
    a second side having a second side periphery,
    a third side having a first side edge and a second side edge,
    a fourth side having a first side edge and a second side edge,
    a top bar of the first side connecting the third side to the fourth side,
    a top bar of the second side connecting the third side to the fourth side,
    wherein the first side periphery is defined by the top bar of the first side, the first side edge of the third side, the first side edge of the drawout base, and the first side edge of the fourth side, and the second side periphery is defined by the top bar of the second side, the second side edge of the third side, the second side edge of the drawout base, and the second side edge of the fourth side, and further wherein the second side allows free access into the drawout box and the first side includes a plate for a drawout handle, the plate connected to the drawout base and free from the first side periphery.

2. The drawout box of claim 1 wherein the second side is open and devoid of panels.

3. The drawout box of claim 1 wherein a remainder of the first side surrounding the plate for a drawout handle is open.

4. The drawout box of claim 1 wherein the first side and the second side are substantially parallel.

5. The drawout box of claim 4 wherein the third side and the fourth side are substantially perpendicular to the first side and the second side.

6. A drawout handle unit for use with a drawout unit for a motor control center, the drawout handle unit comprising:
    a handle plate containing a first handle slot;
    a user operable drawout handle;
    a stem passing through the first handle slot and attached to the drawout handle;
    a circuit breaker handle abutting lever attached to the stem on a first side of the abutting lever, the abutting lever containing a second handle slot for surrounding a circuit breaker handle, the abutting lever including a pivotal connection on a second side of the abutting lever pivotally connecting the abutting lever to the drawout unit, wherein movement of the drawout handle translates to movement of the abutting lever.

7. The drawout handle unit of claim 6 wherein a longitudinal axis of the first handle slot is substantially perpendicular to a longitudinal axis of the second handle slot.

8. A drawout assembly comprising:
    a drawout box, the drawout box including
        a drawout base having a first side edge, second side edge, third side edge, and fourth side edge,
        a first side having a first side periphery,
        a second side having a second side periphery,
        a third side having a first side edge and a second side edge,
        a fourth side having a first side edge and a second side edge,
        a top bar of the first side connecting the third side to the fourth side,
        a top bar of the second side connecting the third side to the fourth side,
        wherein the first side periphery is defined by the top bar of the first side, the first side edge of the third side, the first side edge of the drawout base, and the first side edge of the fourth side, and the second side periphery is defined by the top bar of the second side, the second side edge of the third side, the second side edge of the drawout base, and the second side edge of the fourth side, and further wherein the second side allows free access into the drawout box and the first side includes a plate for a drawout handle, the plate connected to the drawout base and free from the first side periphery;
    a terminal assembly mounted upon the drawout base, the terminal assembly including a bus brace, the bus brace having a base plate, an upper surface of said base plate supporting a plurality of lug engaging receptacles, a lower surface of said base plate including sections for receiving bus straps, a corresponding number of lugs for receipt within the plurality of lug engaging receptacles, each lug including at least one port for receiving an output cable, each port having an axis lying parallel to a plane of said base plate and substantially perpendicular to longitudinal axes of the sections in the lower surface of said base plate; and,
    a plurality of output cables extending from the lugs and through the second side of the drawout box.

9. The drawout assembly of claim 8 further comprising a circuit breaker mounted upon the drawout base.

10. The drawout assembly of claim 9 further comprising a drawout handle unit comprising:
    a handle plate containing a first handle slot;
    a user operable drawout handle;
    a stem passing through the first handle slot and attached to the drawout handle;
    a circuit breaker handle abutting lever attached to the stem on a first side of the abutting lever, the abutting lever containing a second handle slot for surrounding a circuit breaker handle extending from the circuit breaker, the abutting lever including a pivotal connection on a second side of the abutting lever, wherein movement of the drawout handle translates to movement of the circuit breaker handle.

11. A drawout assembly comprising:
drawout box having a drawout base, a first side, a second side, a third side, and a fourth side;
a circuit breaker mounted to the drawout base, the circuit breaker having a circuit breaker handle;
a drawout handle unit mounted to the drawout base and free from the sides of the drawout box, the drawout handle unit arranged for operatively moving the circuit breaker handle.

12. The drawout assembly of claim 11 further comprising a circuit breaker platform, the circuit breaker platform positioned between the circuit breaker and the drawout base.

13. The drawout assembly of claim 12 wherein the drawout handle unit is pivotally connected to the circuit breaker platform.

14. The drawout assembly of claim 11 further comprising a terminal assembly.

15. The drawout assembly of claim 14 further comprising a terminal assembly platform, the terminal assembly platform positioned between the terminal assembly and the drawout base.

16. The drawout assembly of claim 14 further comprising output cables extending from the terminal assembly and through the second side of the drawout box, the output cables following a substantially straight path from the terminal assembly to the second side of the drawout box.

17. The drawout assembly of claim 16 wherein the terminal assembly includes lugs having opening for accepting the output cables, the openings facing the second side of the drawout box.

* * * * *